(12) United States Patent
Bensky et al.

(10) Patent No.: US 6,859,761 B2
(45) Date of Patent: Feb. 22, 2005

(54) ACCURATE DISTANCE MEASUREMENT USING RF TECHNIQUES

(75) Inventors: Alan Bensky, Rehovot (IL); Shlomo Berliner, Rehovot (IL); Uri Holzkaner, Rehovot (IL); Edward Mirodin, Rehovot (IL)

(73) Assignee: Bluesoft Ltd., Rehovot (IL)

( * ) Notice: Subject to any disclaimer, the term of this patent is extended or adjusted under 35 U.S.C. 154(b) by 283 days.

(21) Appl. No.: 09/759,601

(22) Filed: Jan. 16, 2001

(65) Prior Publication Data

US 2003/0195723 A1 Oct. 16, 2003

(51) Int. Cl.[7] .............................................. H03F 1/26
(52) U.S. Cl. ........................................................ 702/189
(58) Field of Search .................... 702/189; 342/125, 342/42, 127, 43, 387, 457, 463; 375/347, 202; 455/132, 33.1, 33.4; 370/320, 335, 342, 441, 485

(56) References Cited

U.S. PATENT DOCUMENTS

| | | | |
|---|---|---|---|
| 3,619,058 A | 11/1971 | Hewlett | 356/5 |
| 3,681,695 A | 8/1972 | Cease et al. | 325/305 |
| 3,778,159 A | 12/1973 | Hines et al. | 356/5 |
| 3,779,645 A | 12/1973 | Nakazawa et al. | 356/5 |
| 4,017,859 A | 4/1977 | Medwin | 343/100 CL |
| 4,328,499 A | 5/1982 | Anderson et al. | 343/113 R |
| 4,433,335 A | 2/1984 | Wind | 343/463 |
| 4,633,411 A | 12/1986 | Bliss et al. | 364/481 |
| 4,804,961 A | 2/1989 | Hane | 342/125 |
| 4,851,851 A | 7/1989 | Hane | 342/112 |
| 5,082,364 A | 1/1992 | Russell | 356/5 |
| 5,099,248 A | 3/1992 | Brommer | 342/430 |
| 5,136,298 A | 8/1992 | Williams | 342/112 |
| 5,170,172 A | 12/1992 | Weinstein | 342/458 |
| 5,173,709 A | 12/1992 | Lauro et al. | 342/443 |
| 5,298,904 A * | 3/1994 | Olich | 342/42 |
| 5,428,439 A | 6/1995 | Parker et al. | 356/5.01 |
| 5,448,248 A | 9/1995 | Anttila | 342/400 |
| 5,481,503 A | 1/1996 | Kuhn et al. | 367/100 |

(List continued on next page.)

FOREIGN PATENT DOCUMENTS

| | | |
|---|---|---|
| EP | 0 926 510 A1 | 6/1999 |
| WO | WO 256673 | 8/1996 |

OTHER PUBLICATIONS

R.J. Palmer, Test result of pricise RF posiion system, 6/89, CH2789 IEEE, p. 151–155.*

(List continued on next page.)

*Primary Examiner*—John Barlow
*Assistant Examiner*—Tung S Lau
(74) *Attorney, Agent, or Firm*—Jeffrey D. Moy; Andrew M. Harris; Weiss, Moy & Harris, P.C.

(57) ABSTRACT

A system, apparatus, and method for determining the distance between two objects using an indirect propagation delay measurement is disclosed. A frequency hopping scheme (such as the Bluetooth™ technology) is used to measure the relative phase offset of the received signal between the various frequencies. For a given distance between the objects, the phase offset vs. frequency curve is a straight line with the slope dependent upon the measured distance. After the phase of the received signals is detected, the data is plotted on a curve and the slope is calculated.

54 Claims, 15 Drawing Sheets

U.S. PATENT DOCUMENTS

| | | | | |
|---|---|---|---|---|
| 5,596,330 | A | 1/1997 | Yokev et al. | 342/387 |
| 5,687,196 | A | 11/1997 | Proctor, Jr. et al. | 375/347 |
| 5,694,133 | A | 12/1997 | Ghose | 342/372 |
| 5,724,047 | A | 3/1998 | Lioio et al. | 342/442 |
| 5,745,224 | A | 4/1998 | Oda et al. | 356/4.01 |
| 5,767,409 | A | 6/1998 | Yamaguchi | 73/602 |
| 5,781,282 | A | 7/1998 | Oda et al. | 356/5.03 |
| 5,784,339 | A | 7/1998 | Woodsum et al. | 367/134 |
| 5,815,117 | A | 9/1998 | Kolanek | 342/442 |
| 5,828,693 | A | 10/1998 | Mays et al. | 375/202 |
| 6,175,725 | B1 * | 1/2001 | Auber | 455/130 |
| 2002/0015423 | A1 * | 2/2002 | Rakib et al. | 370/485 |

OTHER PUBLICATIONS

The Official Bluetooth Website, 1 page. Internet source. Apr. 10, 2000.

Designing Cableless Devices with the Bluetooth Specification, 8 pages. Internet source. Apr. 10, 2000.

R.J. Palmer, "Test Results of a Precise, Short Range, RF Navigational/Positional System," IEEE Vehicle Navigation and Information Systems Conference (VNIS '89) (1st: 1989: Toronto), compiled and edited by D.H.M. Reekie, E.R. Case and J. Tsai, pp. 151–155.

* cited by examiner

ACCURATE DISTANCE MEASUREMENT USING RF TECHNIQUES

BACKGROUND OF THE INVENTION

1. Field of Invention

The present invention relates to a system and method for measuring a distance between two objects. More specifically, the present invention relates to a system and method of measuring a distance between two objects using RF techniques.

2. Description of the Related Art

Mobile telephones, pagers, and other wireless communication equipment are now commonplace. More recently, laptop computers, personal digital assistants (PDAs)—such as the Palm™ organizer—have been equipped with wireless communications capabilities. One of the primary benefits of wireless equipment is portability. We can carry our mobile phone with us wherever we go. These wireless devices are currently used for relatively limited purposes, such as making telephone calls, when they are capable of doing much more.

One potential use for wireless devices is in mobile commerce. Wireless devices can be used for buying or selling goods or services, making payments, gathering information, advertising and promotion, and the exchange of information for other commercial or non-commercial purposes. The success of mobile commerce and other wireless applications will depend on their acceptance by consumers at large. Accordingly, wireless applications must be easy to use and convenient. New platforms are being developed to enable mobile commerce and other applications for wireless devices. Bluetooth™ is such a technology. Bluetooth™ provides a wireless networking protocol for linking various wireless equipment, such as mobile computers, mobile phones, and PDAs. Bluetooth™ operates in the Industrial Scientific and Medical (ISM) 2.4 GHz region.

In addition to platforms such as Bluetooth™, wireless devices require additional enabling technologies to reach their full potential. One such technology involves distance measurement. The distance between two or more wireless devices may be needed in a variety of applications. In many cases, it may be undesirable to measure the distance between two wireless devices directly. Direct distance measurement may be impossible, impractical, intrusive, or simply inconvenient. Moreover, because one or more wireless devices may be moved, the distance between devices will not be fixed indefinitely and re-calculation may be needed.

In such situations, 'wireless' distance measurements are used. Some 'wireless' distance measurement systems require an infrastructure to be put in place such as GPS based systems, triangulation methods, and other positioning techniques. Other systems require line-of-sight conditions (e.g., infra red, laser, and optical methods). Radar as well as ultra sonic systems are bulky, complex, and consume significant amounts of power. New ultra wide band techniques are currently not approved by the authorities. Some less expensive systems offer solutions based on field strength measurements with the tradeoffs of reduced reliability and high environmental dependency.

SUMMARY OF THE INVENTION

The present invention has been made in view of the above circumstances and has an object to provide a system and method for accurately measuring distance using RF techniques.

In one aspect of the invention there is provided a wireless communication device, comprising a first synthesizer for generating a first radio frequency (RF) signal, the first RF signal including a sequence of carriers; a transmitter for transmitting the first RF signal; a receiver for receiving a second RF signal from a remote wireless device phase locked with the first wireless device, the second RF signal including a sequence of carriers corresponding to the carriers of the first RF signal, wherein the frequencies of the corresponding sequence of carriers of the first RF signal are different from the frequencies of the sequence of carriers of the second RF signal; a second synthesizer for generating a third RF signal, the third RF signal including a sequence of carriers corresponding to the carriers of the first and second RF signals, wherein the phase of the third RF signal is coherent with the phase first RF signal, and wherein the frequencies of the sequence of carriers of the second RF signals are the same as the frequencies of the sequence of carriers of the third RF signal; a phase detector for comparing the phase of each of the carriers of the second RF signal to the phase of each of the corresponding carriers of the third RF signal and generating a sequence of phase offsets; and a processor for determining distance between the wireless communication device and the remote wireless device by calculating an estimated slope of the sequence of phase offsets relative to the frequencies of the sequence of carriers of the second RF signal.

In another aspect of the invention, there is computer readable medium containing program instructions for controlling a wireless communication device and for determining distance between the wireless communication device and a remote wireless device, comprising instructions for generating a first radio frequency (RF) signal, the first RF signal including a sequence of carriers; transmitting the first RF signal; receiving a second RF signal from a remote wireless device phase locked with the wireless communication device, the second RF signal including a sequence of carriers corresponding to the carriers of the first RF signal, wherein the frequencies of the sequence of carriers of the first RF signal are different from the frequencies of the sequence of carriers of the second RF signal; generating a third RF signal, the third RF signal including a sequence of carriers corresponding to the carriers of the first and second RF signals, wherein the phase of the third RF signal is coherent with the phase first RF signal, and wherein the frequencies of the sequence of carriers of the second RF signal are the same as the frequencies of the sequence of carriers of the third RF signal; comparing the phase of each of the carriers of the second RF signal to the phase of each of the corresponding carriers of the third RF signal to generate a sequence of phase offsets; and calculating an estimated slope of the phase offsets relative to the frequencies of the sequence of carriers of the second RF signal, wherein the estimated slope is proportional to the distance between the wireless communication device and the remote device.

In another aspect of the invention, there is provided a method of determining distance between a wireless communication device and a remote wireless device, the method comprising the steps of generating a first radio frequency (RF) signal, the first RF signal including a sequence of carriers; transmitting the first RF signal; receiving a second RF signal from a remote wireless device phase locked with the wireless communication device, the second RF signal including a sequence of carriers corresponding to the carriers of the first RF signal, wherein the frequencies of sequence of carriers of the first RF signal are different from the frequencies of the sequence of carriers of the second RF signal; generating a third RF signal, the third RF signal including a sequence of carriers corresponding to the carriers of the first and second RF signals, wherein the phase of the third RF signal is coherent with the phase first RF signal, and wherein the frequencies of the sequence of carriers of the second RF signal are the same as the frequencies of the sequence of carriers of the third RF signal; comparing the phase of each of the carriers of the second RF signal to the phase of each of the corresponding carriers of the third RF signal to generate a sequence of phase offsets; and calculating an estimated slope of the phase offsets relative to the frequencies of the sequence of carriers of the second RF signal, wherein the estimated slope is proportional to the distance between the wireless communication device and the remote device.

Additional objects and advantages of the invention will be set forth in part in the description that follows, and in part will be obvious from the description, or may be learned by practice of the invention. The objects and advantages of the invention will be realized by means of the elements and combinations particularly pointed out in the appended claims.

It should be understood that both the foregoing general description and the following detailed description are exemplary and explanatory only and are not restrictive of the invention as claimed. It will be apparent to those skilled in the art that various modifications and variation can be made without departing from the scope or spirit of the invention.

BRIEF DESCRIPTION OF THE DRAWINGS

The accompanying drawings, which are incorporated in and constitute a part of this specification, illustrate embodiment(s) of the invention and together with the description, serve to explain the principles of the invention.

DETAILED DESCRIPTION

Figure 1:
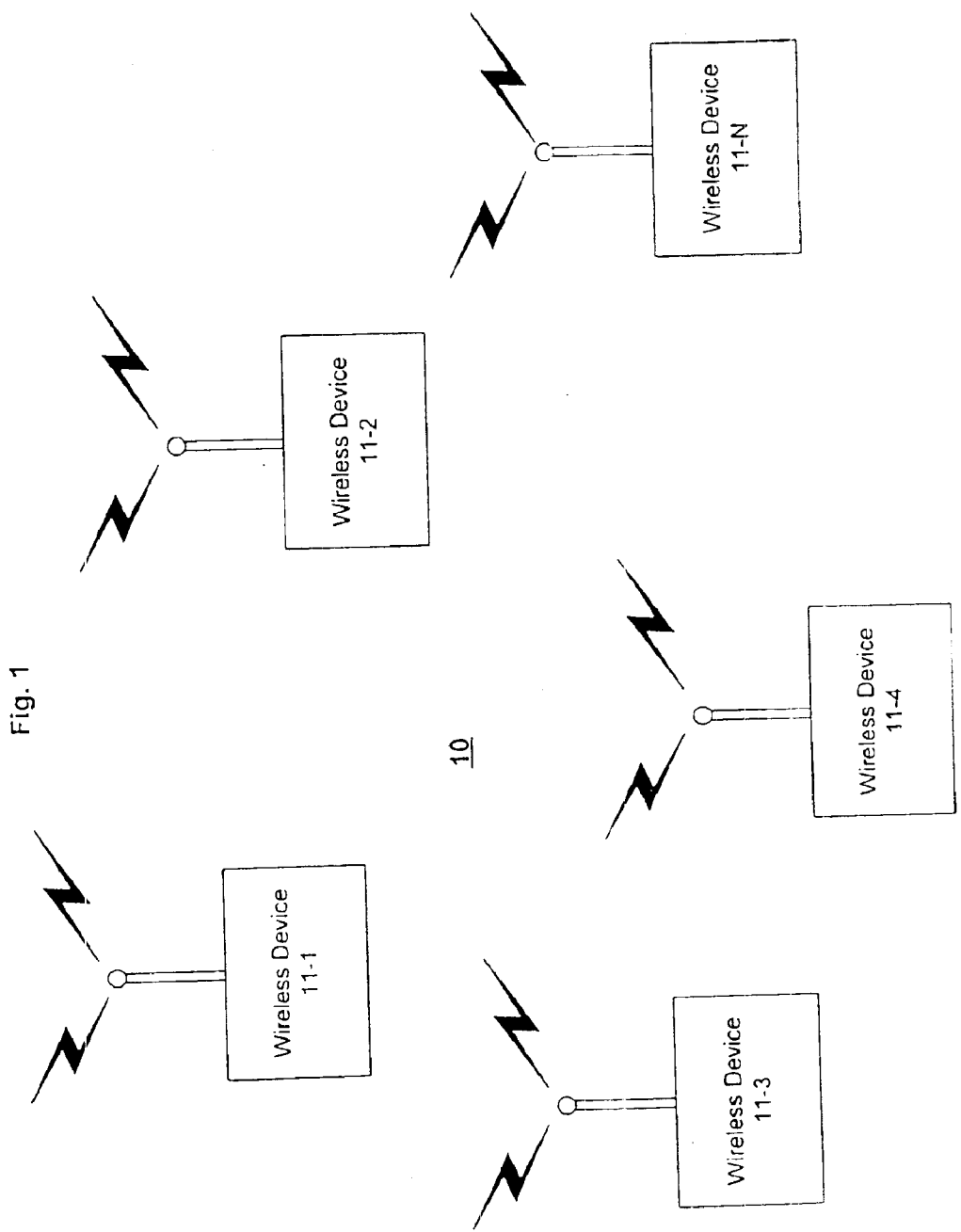
FIG. 1 is a block diagram illustrating an example of multiple electronic devices in accordance with the present invention.

FIG. 1 provides a block diagram illustrating an embodiment of a system 10 in which the present invention may be used. As shown in FIG. 1, the system 10 includes a plurality of wireless devices 11-1 to 11-N (collectively referred to as wireless devices 11) within a particular region. The wireless devices 11 may be communications devices capable of transmitting and receiving information between devices. The information communicated may be data or voice information. At least one and possibly all of the wireless devices 11 are mobile communications devices. For example, the wireless devices 11 may be mobile phones or pagers, or PDAs, handheld computers, laptop computers, or other devices equipped with wireless communications capabilities, or a combination of any of the foregoing. Moreover, the set of wireless devices 11 in the region is not necessarily fixed. Additional wireless devices 11 may enter the region and existing wireless devices 11 may leave the region. It should be understood, however, that the present invention may be used with stationary wireless devices.

To facilitate communications, each wireless device 11 includes one or more antennas. In a preferred embodiment, the antennas are omnidirectional antennas so that a particular wireless device 11 can communicate with any of the other wireless devices 11 within its operable range without regard to where the other wireless devices 11 are located. Of course, other antenna designs may be used with any one or more of the wireless devices 11.

Each of the wireless communications devices 11 may store unique identifying data that it can transmit to the other wireless communication devices 11 in the region. Accordingly, each wireless communication device 11 can identify itself to the other communication devices 11 and distinguish between other wireless communication devices using the identifying data. For example, a wireless device 11-1 can transmit RF signals containing communication data intended specifically for wireless device 11-3. By including the identifying data in the RF transmission, wireless device 11-3 can receive and perform actions responsive to the communication data, while other wireless devices 11 ignore the data. The communication data may be, for example, commercial data exchanged in a commercial transaction between owners or users of wireless devices 11-1 and 11-3. Alternatively, or in addition, the communication data may include advertising data, news, weather, or other useful information.

Communications between the wireless devices 11 can be carried out using a protocol employing a master-slave relationship. In this case, one of the wireless devices 11 in a particular region may be a master with one or more others of the wireless devices 11 in the region serving as a slave. The master device will control communications carried out with the slave devices. In one embodiment, the wireless devices 11 communicate using the Bluetooth™ protocol, but of course other protocols may be used. The Bluetooth™ protocol uses a half-duplex, frequency-hopping scheme operating in the 2.4 GHz band. Bluetooth™ devices hop through 1600 frequency channels per second, with 800 transmit and 800 receive channels. The channels span 79 MHz with a 1 MHz spacing between adjacent channels. Bluetooth™ allows various wireless equipment (mobile phones, mobile computers, etc.) to communicate over relatively short range of about 100 meters.

The present invention determines the distance between wireless devices using an indirect propagation delay measurement. For example, an RF signal, transmitted from wireless device A to wireless device B, will be received at a given phase angle. Fundamentally, for a given transmission distance, there is a linear relationship between the received phase angle offset of the RF signal and the frequency of the RF signal. Accordingly, for a given distance between the devices, the received phase offset angle vs. frequency curve is theoretically a straight line with the slope of the line dependent upon the measured distance. Specifically, the distance between objects is proportional to the slope of the phase/frequency curve. Therefore, by transmitting an RF signal at multiple frequencies, and observing the received phase offset-angles of the RF signal for each of those frequencies, the distance between wireless devices can be calculated. Further, this differential phase measurement resolves the ambiguity caused by the unknown number of cycles the signal has completed before the received signal arrives at the receiving antenna.

One difficulty in implementation is caused by "phase folding." As the frequency of the received RF signal increases, the received phase also increases. Since the phase measurement is constrained to a value from $-\pi$ to $\pi$;, the phase angle will "fold" over to $-\pi$ each time it exceeds $\pi$. A unique algorithm (e.g., software implemented) detects phase "folding" every time the phase difference completes a whole cycle, and corrects by adding $\pi$; to the phase result each time a negative slope ($\pi=>-\pi$) is detected. In this way, a linear series of received phase angles can be obtained. After the phase angles of the received RF signals are detected and corrected for the phase folding effect, the slope of the phase angle data, relative to frequency, can be calculated.

It should be noted that a significant distortion of the measured phase angles may occur in practice as a result of the multipath phenomenon. One or more techniques to analyze, minimize, or eliminate multipath interference can be implemented, for example, as suggested in related patent application U.S. Application No. 09/759,600, filed concurrently herewith and expressly incorporated by reference herein.

As described above, the technique of the present invention requires transmission and reception at multiple frequencies to determine the distance between wireless devices. Consequently, a frequency hopping scheme (such as that employed by Bluetooth™ technology) serves as an appropriate platform on which to implement the invention. While the invention will be described with respect to Bluetooth™, this is just one of many possible implementations of the invention. Any number of methods employ transmission of multiple frequencies could be used to implement the invention.

The present invention may be used in a variety of applications including, but not limited to, mobile commerce, mobile banking, and information on demand. While the present invention can be used to measure the distance between two wireless devices without any additional infrastructure, e.g., a base station and a remote unit, it can also be used to determine distance between any number of wireless devices, e.g., a base station and multiple remote wireless devices, or between remote wireless devices.

Transactions between wireless devices may be directed based on the result of this distance measurement. For example, if the distance between the wireless devices is within a specified criteria, information (advertisements, news, weather, travel) may be pushed from one unit to the other, payment for goods, services or information may be effected, or banking transactions initiated (e.g., obtaining account statement information, transferring funds between accounts). Other applications will be known to those skilled in the art and are within the scope of the present invention.

Figure 2:
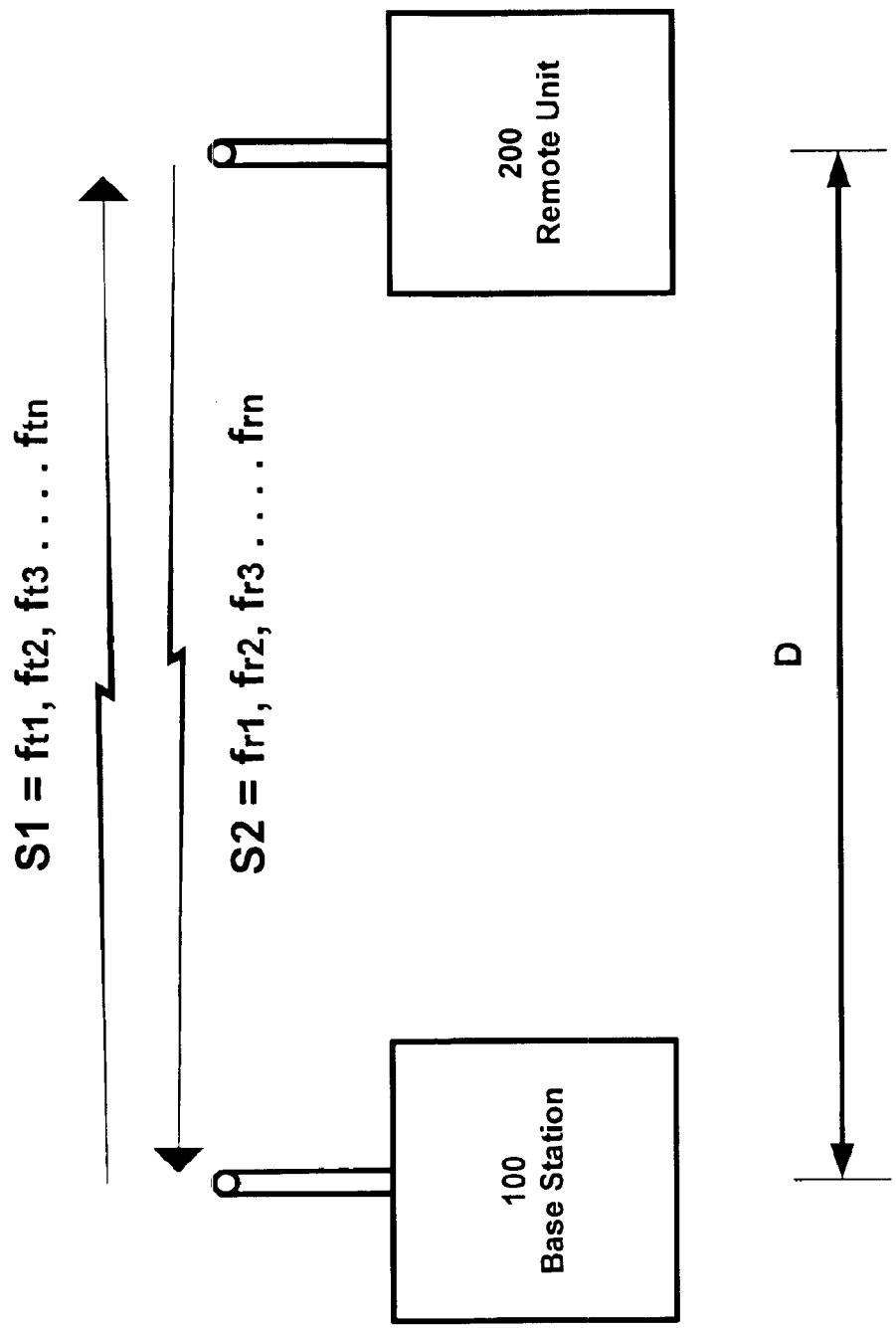
FIG. 2 is an illustrative block diagram of a base station and remote unit in accordance with an embodiment of the present invention.

FIG. 2 illustrates the operation of an embodiment of the present invention. For simplicity, the operation of the present invention will be described with reference to two wireless devices: a base station 100 and a remote unit 200. As shown, the base station unit 100 is separated from the remote unit 200 by a distance D. As described above, the distance may be determined by measuring the differential phase between two or more frequencies of a signal transmitted between the base station 100 and the remote unit 200. In one embodiment of the present invention, frequency hopping is used by the base station 100 and the remote unit 200 to generate the signals necessary to determine the distance measurement.

A signal S1 using a sequence of carriers at frequencies $f_{r1}$, $f_{r2}$, ... $f_{rn}$ is generated at base station 100 and transmitted to remote unit 200. At remote unit 200, the signal S1 is received and demodulated. The demodulated signal is used as a reference to generate a second signal S2. Signal S2 includes a sequence of carriers having frequencies $f_{r1}$, $f_{r2}$, ... $f_{rn}$. The remote unit transfers the phase information of signal S1 to signal S2. The frequencies in each sequence of carriers may be in ascending order, in descending order, another pattern, or in random order, for example. Additionally, the spacing between adjacent carrier frequencies contained in a sequence (i.e., irrespective of their order in the sequence) may be constant, vary according to a pattern, skip some frequencies, or occur randomly within a range. Thus, base station 100 and remote unit 200 remain synchronized, or phase locked, with each other. Signal S2 is transmitted from the remote unit 200 back to the base station 100 where it is frequency converted to the frequencies of signal S1 and phase compared with the signal S1. Alternatively, an additional RF signal, phase coherent with S1, may be generated in base station 100 and be used to do the phase comparison with S2. This arrangement obviates the need to frequency convert S2 before performing the phase comparison.

Phase comparison of the corresponding frequency increments of signal S1 and frequency converted signal S2 provides a phase offset $\Theta i$ for each of the frequencies. The relative phase offsets $\phi i$ between the frequency increments is calculated by subtracting phase offsets $\Theta i$ of the carriers of S2 having adjacent frequencies. A software implemented phase ambiguity algorithm is applied during the calculation to account for the phase folding resulting from any repeated cycling of the phase difference from $-\pi$ to $+\pi$. Once the relative phase offset information is obtained, the distance D can be calculated from the slope of the relative phase offsets ($\phi i$) v. frequency data.

The embodiment illustrated in FIG. 2 is directed to a full-duplex system in which signal transmission and reception occur simultaneously requiring the frequencies of S1 to be different from the frequencies of S2. However, as will be described later, the present invention could also be implemented, for example, in a half-duplex manner allowing the use of the same frequencies for signals S1 and S2, thereby obviating the need to convert the frequencies of signal S2 to the frequencies of S1, or the frequencies of signal S1 to the frequencies of S2, for phase comparison.

RF communications, control, and processing functionality of the base station 100 may be performed by common equipment, for example, under different software control, or may be performed by different equipment. Examples are described below in connection with FIG. 3A, 3B, and 3C. However, it should be understood that control, processing, and RF communications functionality may be performed by various equipment configurations depending on the type of device that base station 100 embodies and the degree of overlap and compatibility between the distance measurement functionality and other functionality of the base station 100.

For example, if the base station 100 is a Bluetooth-enabled mobile telephone, the base station 100 requires RF communications for mobile telecommunications, distance measurement, and Bluetooth communications. The same or different control and/or RF equipment may be used for wireless communications to network infrastructure (e.g., mobile telephone to cellular base station), for distance measurement, and for direct wireless device-to-wireless device (e.g., Bluetooth) communications. The same may be true of a Bluetooth-enabled laptop with a RF modem for linking to an ISP and many other devices equipped for wireless communications using multiple different protocols. On the other hand, the base station 100 may embody a wireless device that supports distance measurement and a single wireless communications protocol (e.g., a Bluetooth-equipped vending machine, a mobile telephone, laptop with an RF modem, etc.). The same or different control and/or RF equipment may be used for wireless communications and for distance measurement. Finally, the base station 100 may be equipped for RF communication only to perform wireless distance measurement. In this case, only a single RF communications equipment for distance measurement need be provided.

Figure 3A:
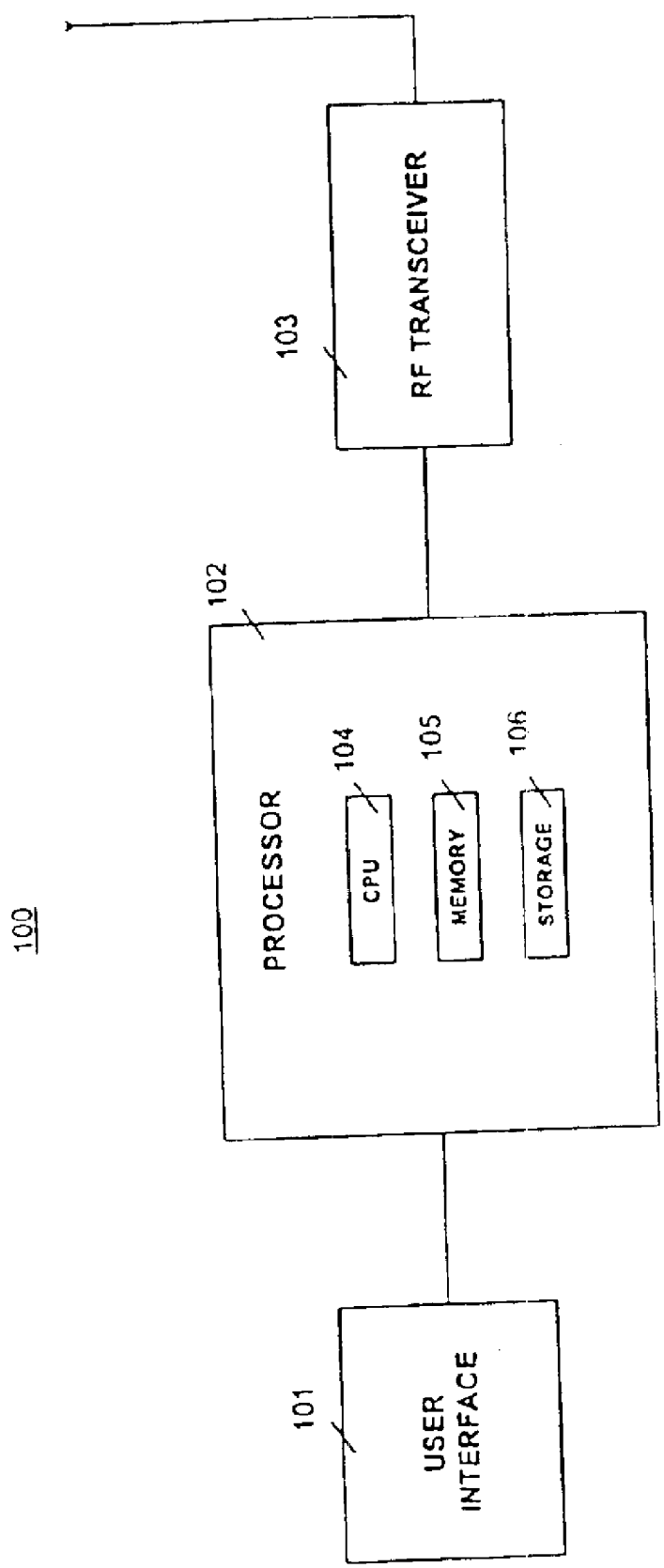
FIGS. 3A–3C are illustrative block diagrams of the base station according to FIG. 2 having an RF transceiver, processor, and user interface.

FIG. 3A is a functional block diagram illustrating some of the components of the base station 100 according to an exemplary embodiment. As shown, base station 100 includes a user interface 101, a processor 102, and an RF transceiver 103. The processor 102 further includes a central processing unit (CPU) 102, memory 105, e.g., DRAM, and data storage medium 106. The user operates the base station through the user interface 101. User interface 101 can include any number of input controls and output devices, such as a visual display, a keypad, pointer, a mouse, tracking ball, a four-button pad, speaker(s), a microphone, or any combination of the foregoing.

Processor 102 is coupled between the user interface 101 and the RF transceiver 103. Processor 102 receives phase and amplitude data (e.g., I and Q data, as will be used in the following examples) from the RF transceiver 103 and calculates distance, which can be displayed on the user interface or used to control a distance-based process. The processor also controls the transceiver 103 and receives control information from the user interface 101. The I/Q data from the RF transceiver 103 is typically stored in memory 105 for processing by CPU 104. Further, storage space 106 contains program instructions for the CPU as well as other static data such as the device ID information. In handheld devices, storage 106 is typically a non-volatile read only memory. In larger base station implementations, the storage space can be a hard disk drive. It is anticipated that the program instructions for the processor 102 can be embedded for storage, transport, or sale, in any suitable computer readable mediums, such as a floppy diskette, optical disk, a memory chip or a memory portion of a chip, or can be stored on a server and downloaded to the processor for use. The RF transceiver 103 is typically implemented as a combination of discrete components or a smaller number of integrated chipsets.

In addition to calculating the distance, for example, as described below, the processor 102 and the transceiver 103 may operate to communicate according to one or more communication protocols using the same or different frequencies than used for distance measurement. For example, if the base station 100 were a mobile telephone, the processor 102 and transceiver 103 may be used to handle mobile telephone communications. For example, the base station may transmit and receive communications signals with a cellular station, a satellite, or other network switching infrastructure. In addition, the processor 102 and transceiver 103 may be used to handle other communications protocol(s), such as Bluetooth, for example. The base station 100 may communicate directly with other wireless devices. In this regard, the base station 100 may use common equipment for distance measurement and for other communications. Alternatively, the RF transceiver 103 may be used solely for distance measurement.

Figure 3B:
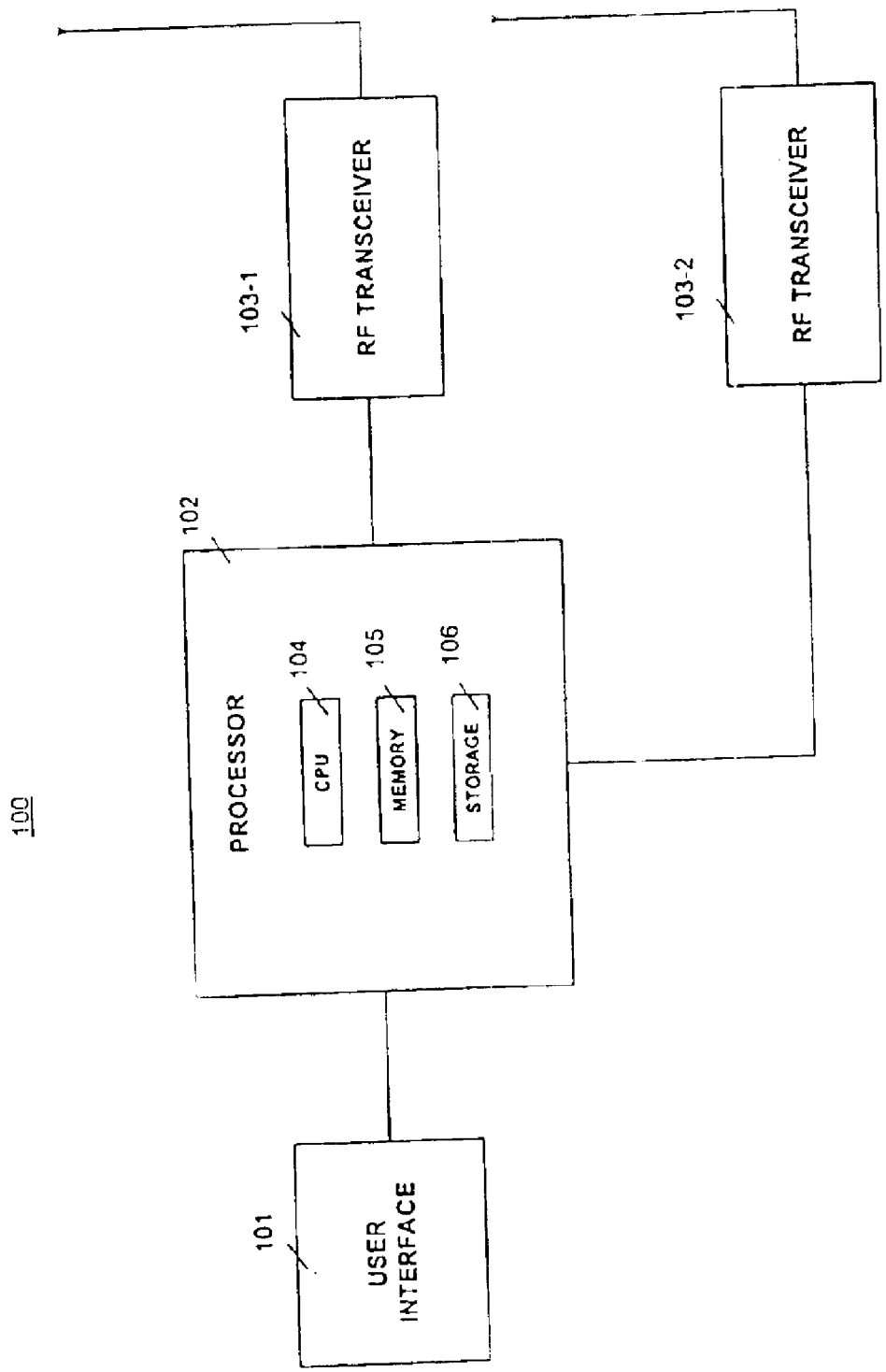

FIG. 3B illustrates a further exemplary embodiment of a base station 100. FIG. 3B is similar to FIG. 3A, but includes RF transceiver 103-1 and RF transceiver 103-2. In accordance with the embodiment of FIG. 3B, the RF transceiver 103-1 may be used for communications according to a first set of one or more communications protocols and RF transceiver 103-2 may be used for distance measurements and possibly communications according to a second set of one or more communications protocols. Processor 102 controls transceivers 103-1 and 103-2 and may process information received from either or both transceivers. In accordance with FIG. 3B, the base station 100 may be, for example, a mobile telephone. RF transceiver 103-1 may handle telephone communications and RF transceiver 103-2 may handle distance measurement RF transmissions and possibly other communications, such as Bluetooth communications.

Figure 3C:
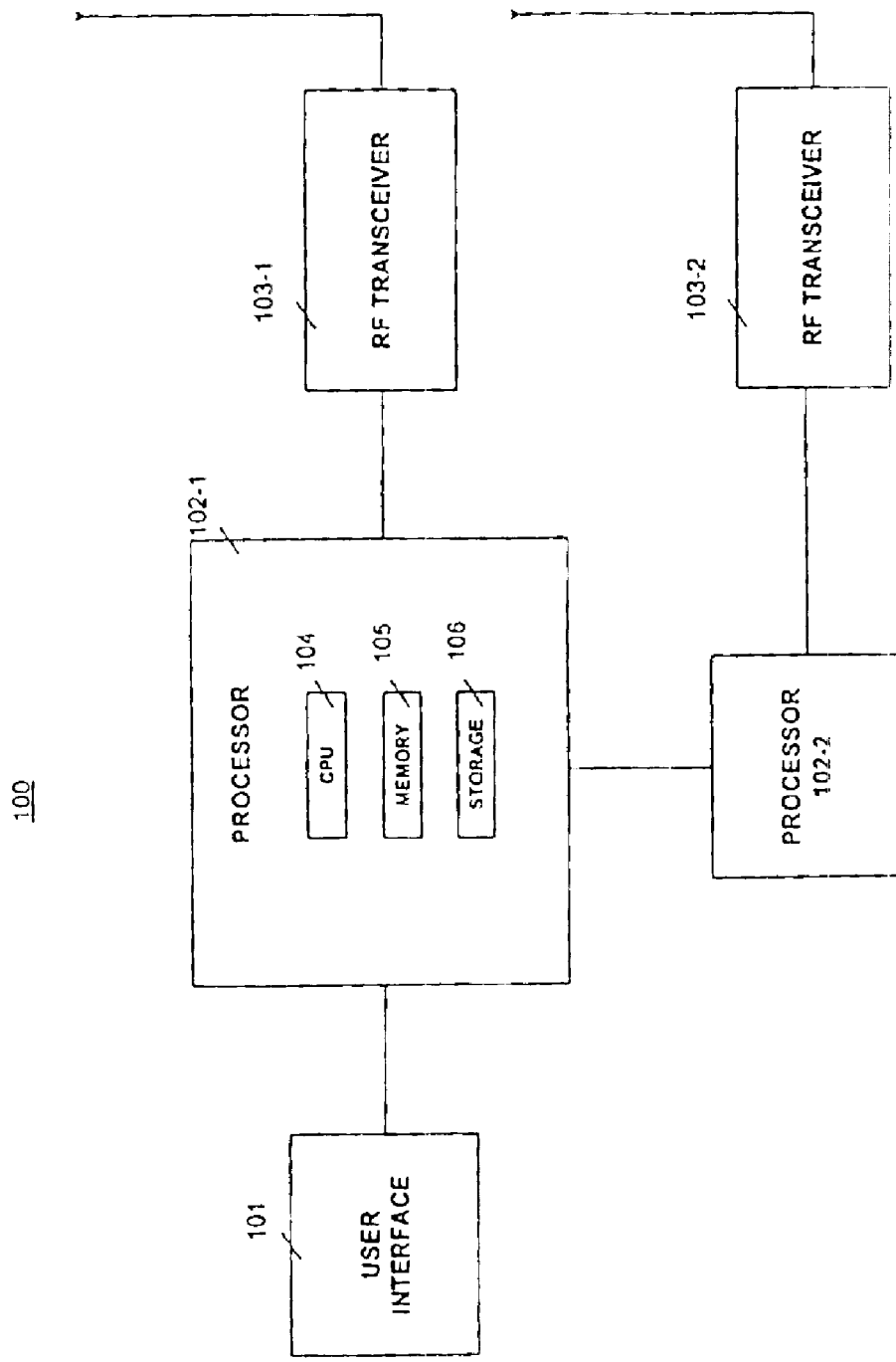

FIG. 3C illustrates a further exemplary embodiment of a base station 100. FIG. 3C is similar to FIG. 3A, but includes processors 102-1 and 102-2 and transceivers 103-1 and 103-2. In accordance with the embodiment of FIG. 3C, the processor 102-1 and RF transceiver 103-1 may be used for communications according to a first set of one or more communications protocols and processor 102-2 and RF transceiver 103-2 may be used for distance measurements and possibly communications according to a second set of one or more communications protocols. Processor 102-1 controls and may process data from transceiver 103-1 and processor 102-2. Processor 102-2 controls and processes information from RF transceiver 103-2. Processor 102-2 also communicates with processor 102-1. In accordance with FIG. 3C, the base station 100 may be, for example, a mobile telephone. RF transceiver 103-1 may handle telephone communications and RF transceiver 103-2 may handle distance measurement RF transmissions and other communications, such as Bluetooth communications. Processor 102-1 may be used to control mobile telephone communications and perform overall device control. Processor may be used for controlling distance measurement control, such as mathematical processing, and perform control operations for another communications protocol, e.g., Bluetooth. The embodiments of FIGS. 3B and 3C are useful, for example, where the distance measurement functionality is added to an existing device design. In the embodiment of FIG. 3B, the processor 102 of the existing device may be loaded with software for performing distance measurement calculations. FIG. 3C provides an alternative where the processor 102-1 is not capable or would not be efficient for performing the distance measurement calculations.

Figure 4B:
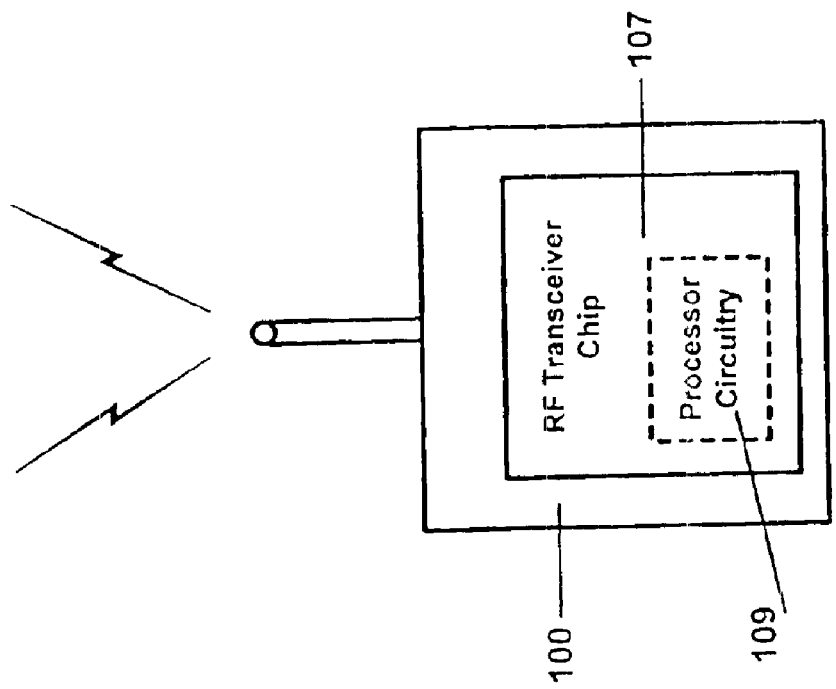
FIGS. 4A–4B are illustrative block diagrams of the base station according to FIG. 2.
Figure 4A:
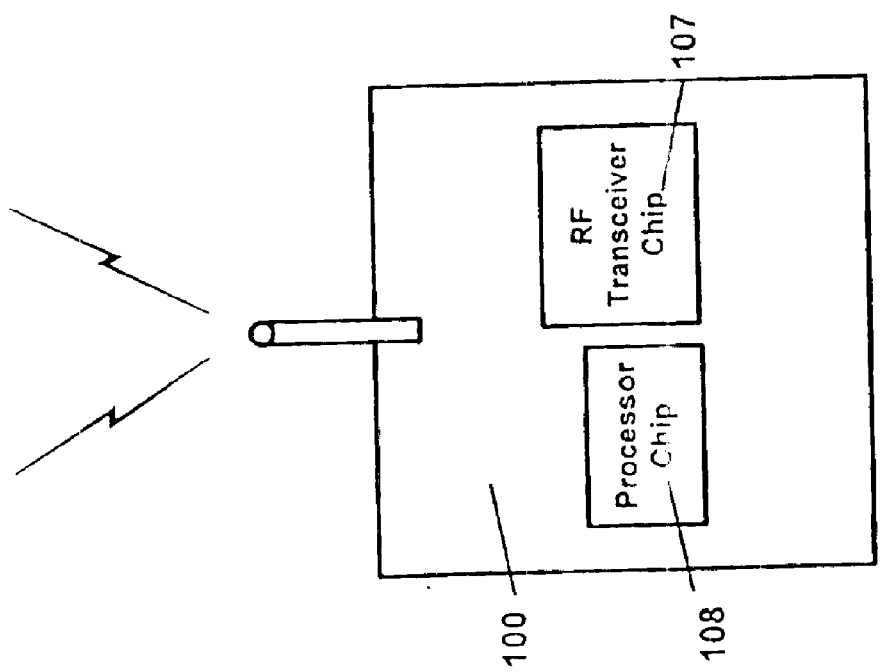

FIGS. 4A and 4B show two alternative implementations of the present invention in base station 100. As shown in FIG. 4A, the distance measurement functionality may be implemented as a separate processor chip 108 and used in conjunction with a RF transceiver chip 107. The processor chip 108 may be, for example, a general purpose microprocessor, a math processor, or an ASIC built using, for example, CMOS technology. The RF transceiver chip 107 may be, for example, a Bluetooth chip or other RF communications chip. The RF transceiver chip 107 may be built using bipolar technology or BiCMOS technology.

Alternatively, as shown in FIG. 4B, the RF transceiver chip 107 may include memory 109 and processor circuitry 110 for performing distance measurement calculations. The processor circuitry 110 may be general purpose processing circuitry or a specially-designed circuit for performing distance measurement calculations. Accordingly, the RF transceiver chip 107 may output a distance value directly. The RF transceiver chip 107 may be a Bluetooth chip. Other platforms will be known to those skilled in the art and are within the scope of the present invention.

Figure 5:
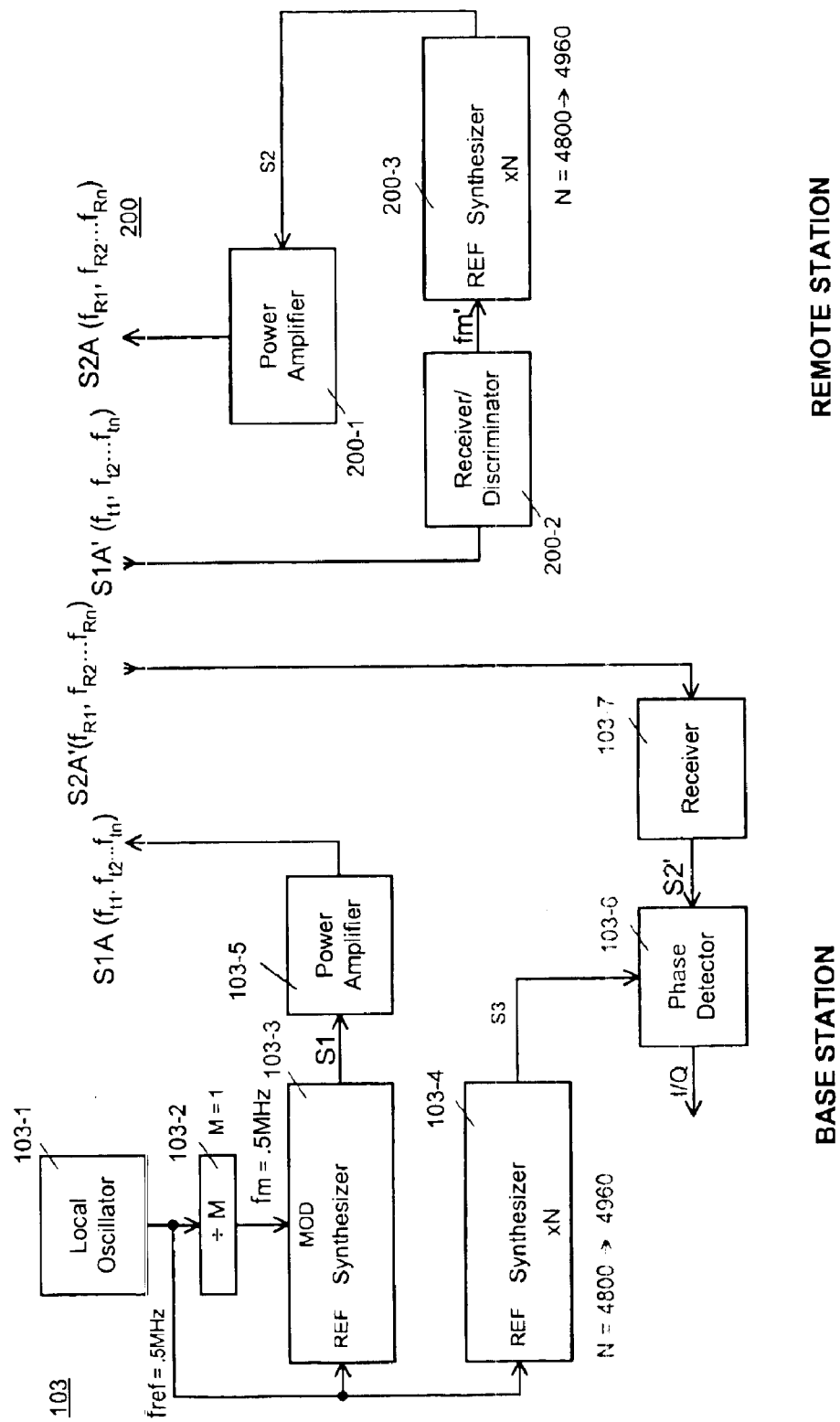
FIG. 5 is an illustrative functional block diagram of a base station and a remote unit in accordance with an embodiment of the present invention.

FIG. 5 illustrates exemplary RF circuitry that may be included in the base station 100 and the remote station 200. FIG. 5 has been simplified for purposes of explanation and is not intended to show every feature of the base station 100 and the remote station 200. As shown, the base station 100 includes a local oscillator 103-1, divider 103-2, synthesizer 103-3, synthesizer 103-4, power amplifier 103-5, phase detector 103-6, and receiver 103-7. Local oscillator 103-1 generates a system clock, or reference frequency $f_{ref}$, which is coupled to the reference inputs of synthesizers 103-3 and 103-4. In this example, the value of $f_{ref}$ will be set to 0.5 MHz. System clock $f_{ref}$ is also divided by divider ($\div$M) 103-2 to generate a modulation signal $f_m$. Integer M can be set to an integer value of at least one or higher. In this case, M will be set to a value of 1. Consequently, in this example, $f_m$ is also equal to 0.5 MHz. Modulation signal $f_m$ is coupled to the modulation input of synthesizer 103-5. Because modulation signal $f_m$ is derived from $f_{ref}$, it maintains phase coherency with $f_{ref}$. Likewise, because the carriers having frequencies $f_{t1}, f_{t2}, \ldots f_{tn}$ are derived from $f_{ref}$, phase coherency between these carriers having frequencies $f_{t1}, f_{t2}, \ldots f_{tn}$, and signals $f_{ref}$ and $f_m$ is maintained.

Synthesizer 103-3 generates a frequency hopping spread spectrum (FHSS) signal S1, which is comprised of a sequence of carriers at different frequencies. Each carrier is a multiple of the reference frequency $f_{ref}$. Signal S1 is modulated by $f_m$ and coupled to the input of power amplifier 103-5. Signal S1 is therefore comprised of a sequence of carriers, each modulated by $f_m$. Power amplifier 103-5 amplifies S1 to produce amplified signal S1A. Signal S1A is propagated over distance D to the remote unit 200.

Synthesizer 103-4 generates an FHSS signal S3, which is comprised of a sequence of carriers at different frequencies. Each carrier is a multiple of the reference frequency $f_{ref}$. Each of the carriers in the sequence of carriers of signal S3 has a corresponding carrier from the sequence of carriers of S1. Typically, in a full duplex design, signals S1 and S3 are required to be within different frequency bands.

Receiver 103-7 receives external FHSS signal S2A' (transmitted from remote station 200). Signals S2A' and S3 have the same carrier frequencies. Signal S2A' is comprised of a sequence of phase shifted carriers corresponding to the carriers of signal S3 generated by synthesizer 103-4. Further, the sequence of carriers of signal S2A' are equal in frequency to the sequence of carriers of signal S3 generated by the synthesizer 103-4. Signal S2' and S3 are coupled to the inputs of phase detector 103-6 for phase comparison. Phase detector 103-6 generates a sequence of DC I/Q outputs corresponding to the phase and amplitude of the sequence of carriers of S2'.

Also shown in FIG. 5 is the remote station 200. Remote station 200 includes a receiver/discriminator 200-2, synthesizer 200-3, and power amplifier 200-1. The receiver/discriminator 200-2 receives FHSS signal S1A' (comprised of a sequence of carriers having frequencies $f_{t1}, f_{t2}, \ldots f_{tn}$) from the RF transceiver 103 of the base station 100 and recovers the modulation signal $f_m'$. Modulation signal $f_m'$ is coupled to the input of synthesizer 200-3. Synthesizer 200-3 multiplies $f_m'$ by a sequence of integers to generate FHSS signal S2, which is comprised of a sequence of frequencies $f_{r1}, f_{r2}, \ldots f_{rn}$. In this example, N will be a sequence of integers from 4804–4960. Signal S2 is coupled to the input of power amplifier 200-1, amplified, and transmitted to receiver 103-7 of base station 100.

As shown in FIG. 5, modulated signal $f_m$ is transmitted from base station 100 to remote unit 200 using a frequency hopping scheme. For purposes of obtaining the distance measurement, the message content and method of modulation are academic (requiring only that phase coherency be maintained) and are dependent on the specific application and platform used. For example, if using the Bluetooth™ technology the method of modulation used would most likely be gaussian frequency shift keying. Other modulation techniques will be known to those skilled in the art and are within the scope of the present invention.

Once the signal S1' is received at the remote unit 200 by receiver 200-2, it is frequency discriminated to obtain a received version of original modulation signal signal $f_m'$. Modulation signal $f_m'$ contains the phase information of the received signal S1A'. Modulation signal $f_m$ can therefore be used to synchronize a voltage controlled oscillator (VCO) within the synthesizer 200-3. More specifically, modulation signal $f_m'$ can be used as a reference signal for the synthesizer 200-3 to generate FHSS signal S2, comprising carriers having frequencies ($f_{r1}, f_{r2}, \ldots f_{rn}$). To accomplish this, synthesizer 200-3 multiplies $f_m'$ (in this case, 0.5 MHZ) by a sequence of integers N (in this case, 4804=>8960). Each of the frequencies of S2 is therefore phase coherent with modulation signal $f_m$. S2 is amplified by power amplifier 200-1 to generate signal S2A and transmitted back to the base station 100.

At base station 100, FHSS signal S2A' is received by receiver 103-7 and amplified to produce FHSS signal S2'. The signal S2A' is the same frequency as S3 (generated by synthesizer 103-4), except for a difference in the phase angle due to the propagation distance experienced by signal S1A' and S2A'. Signal S2' is phase compared with the S3 by phase detector 103-6. The phase comparison is performed by generating In-phase (I) and Quadrature (Q) DC signals and performing a simple arithmetic calculation to find the phase shift. I/Q data is stored in memory 105 of the processor 102 (shown in FIG. 3). After I/Q data is collected for a sufficient number of adjacent carrier frequencies, CPU 104 executes a distance measurement algorithm that operates on the stored I/Q data to calculate the distance between the base station 100 and remote station 200.

Notably, in this embodiment, the carrier frequencies of S1A are different from the carrier frequencies comprising S2A. Consequently, this embodiment is well suited for, but not limited to, full-duplex operation. Moreover, the full-duplex transmission scheme described herein need not transmit carrier frequencies in incrementing or decrementing order, and in practice, the sequential order of carrier frequency transmission may be quite random. In operation, it is only necessary that the base station and the remote station follow the same hopping sequence of carrier frequencies. Many other transmission schemes are known and could take advantage of other variation of the full-duplex operation of this embodiment of the present invention.

In alternative embodiments, synthesizer 103-4 generates a FHSS signal having a sequence of carriers (S3) at different frequencies than those of S2A'. This requires that S2A' be frequency-converted by receiver 103-7 to the same frequency as the FHSS signal output from synthesizer 103-4. This frequency-conversion is necessary because of the requirement that the two inputs to phase detector 103-6 be at the same frequency for meaningful phase comparison. Generally, any transceiver arrangement that allows a phase detector to compare phases of equal frequency signals will suffice.

Figure 6:
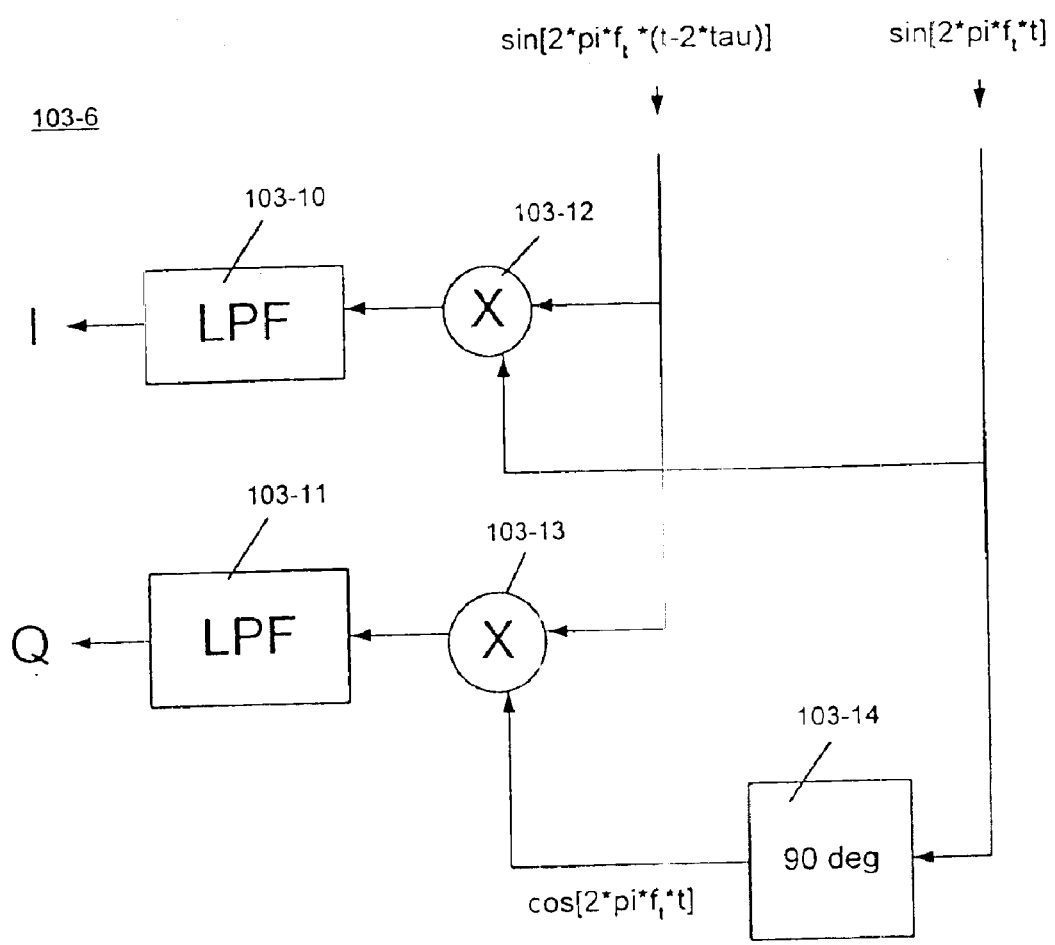
FIG. 6 is an illustrative functional block diagram of a phase detector in accordance with an embodiment of the present invention.

FIG. 6 is a detailed illustration of one example of phase detector 103-6. As shown, phase detector 103-6 includes a 90 degree phase shifter 103-14, RF mixers 103-12 and 103-13, and low pass filters (LPFs) 103-10 and 103-11. Mixer 103-12 receives input signal S3 (sin $[2\pi f_r t]$) from the synthesizer 103-4 and input signal S2' (sin$[2\pi f_r(t-2\tau)]$) from receiver 103-7. Mixer 103-12 mixes these two signals and sends the result to low pass filter 103-10 to remove unwanted harmonics. Mixer 103-13 receives input signal S2' (sin$[2\pi f_r(t-2\tau)]$) from receiver 103-7 and S3 (cos$[2\pi f_r t]$) from the 90 degree phase shifter 103-14. The 90 degree phase shifter 103-14 receives as an input S3 (sin$[2\pi f_r t]$) from synthesizer 103-14. Mixer 103-13 mixes these two signals and sends the result to low pass filter 103-11 to remove unwanted harmonics. The inphase and quadrature signals I and Q are thereby output from low pass filters 103-10 and 103-11, respectively. The phase differences (I and Q components) are forwarded to the CPU 103 (Shown in FIG. 3) for further processing, e.g., calculation of the phase/frequency slope.

The I and Q components are generated by mixing the received signal sin $[2\pi f_r(t-2\tau)]$ with the locally generated signal sin$[2\pi f_r t]$ as illustrated in FIG. 6, where $\tau$ is the one-way time delay. Using the resulting I and Q components (stored in memory 105) to solve for $\tau$ yields:

$Q/I=\tan[2\pi f_r*2\tau]$ $\tau=\arctan(Q/I)/4\pi f_r$

Figure 10:
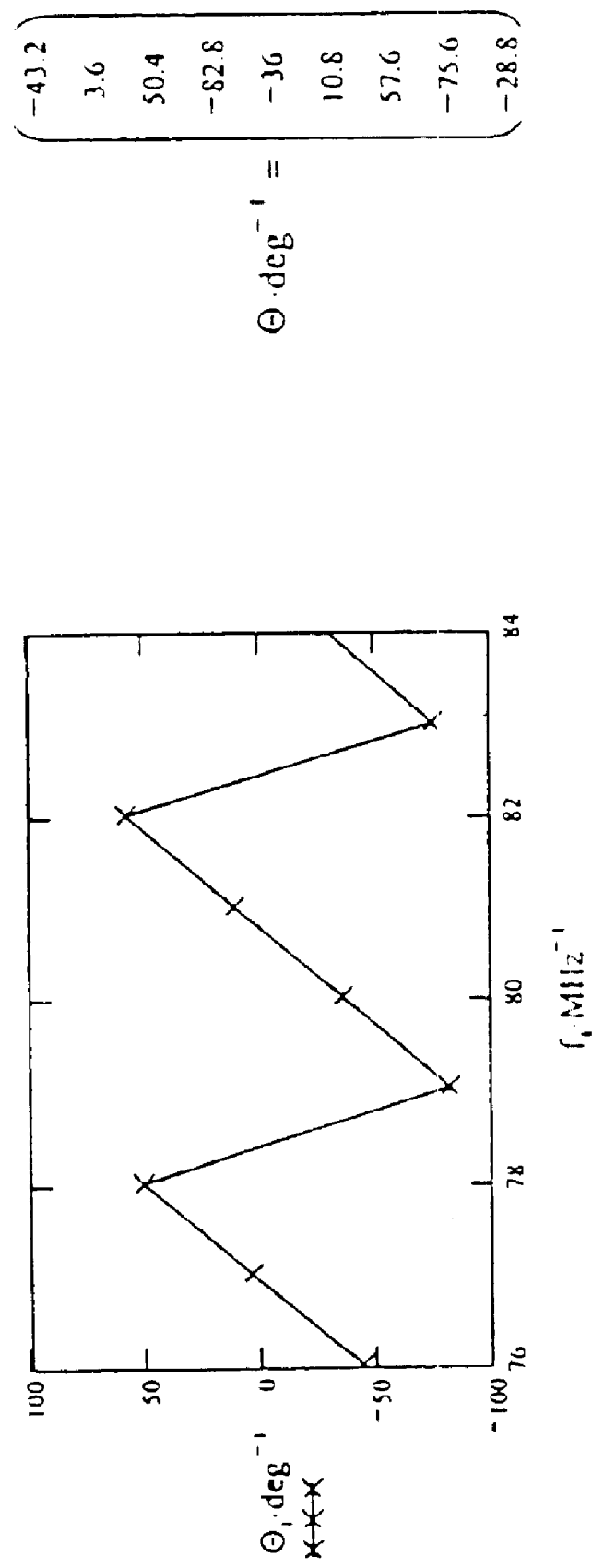
FIG. 10 is an exemplary chart showing one possible set of data obtained in accordance with the operation of the present invention.

Once an ambiguous value for $\tau$ ($\tau^*$) is determined, the phase shift $\Theta_1:=2\pi f_r\tau^*$ may be calculated. After the data (phase shift v. frequency) on the various frequencies is collected, a least mean square (LMS) error criteria is used to estimate the expected straight line curve. FIG. 10 illustrates one example of a plotting of the phase shift v. frequency data using $\tau:=130$ ns and a starting frequency F:=76 MHz with increments of $\Delta F:=1$ MHz such that $f_i:=F+\Delta Fi$.

As indicated in the graph of FIG. 10, a sawtooth curve results as the phase shift value "drops" to $-\pi$ each time the phase shift cycles through $\pi$. To straighten out the angle v. frequency data, the following phase ambiguity algorithm is applied to a sequence of carriers having frequencies $f_{r1}$, $f_{r2}, \ldots f_m$:

$\phi(n):=0$ if $n=0$;  (1)

otherwise, $\phi(n):=(\Theta n-\Theta n-1)+\phi(n-1)+\pi$ if $\Theta n-\Theta n-1<0$  (2)

$\phi(n):=(\Theta n-\Theta n-1)+\phi(n-1)$ otherwise.  (3)

At step (1), the value of $\phi(n)$ is initialized to equal 0 for the first carrier frequency $f_{r0}$ thereby establishing a baseline for calculating the next plotted phase value.

At step (2), the algorithm checks for the negative slope ($\Theta n-\Theta n-1<0$) which would occur as the estimate drops to $-\pi$; as the phase difference cycles through $+\pi$. When the negative slope is detected, the algorithm adds the relative phase offset ($\Theta n-\Theta n-1$) of the points to the previous data point ($\phi(n-1)$) $+\pi$ and substitutes the resulting value for the zero estimate.

At step (3), if the algorithm determines that the slope is not negative, the algorithm adds the relative phase offset ($\Theta n-\Theta n-1$) of the points to the previous data point ($\phi(n-1)$) and substitutes the resulting value for the zero estimate.

Figure 11:
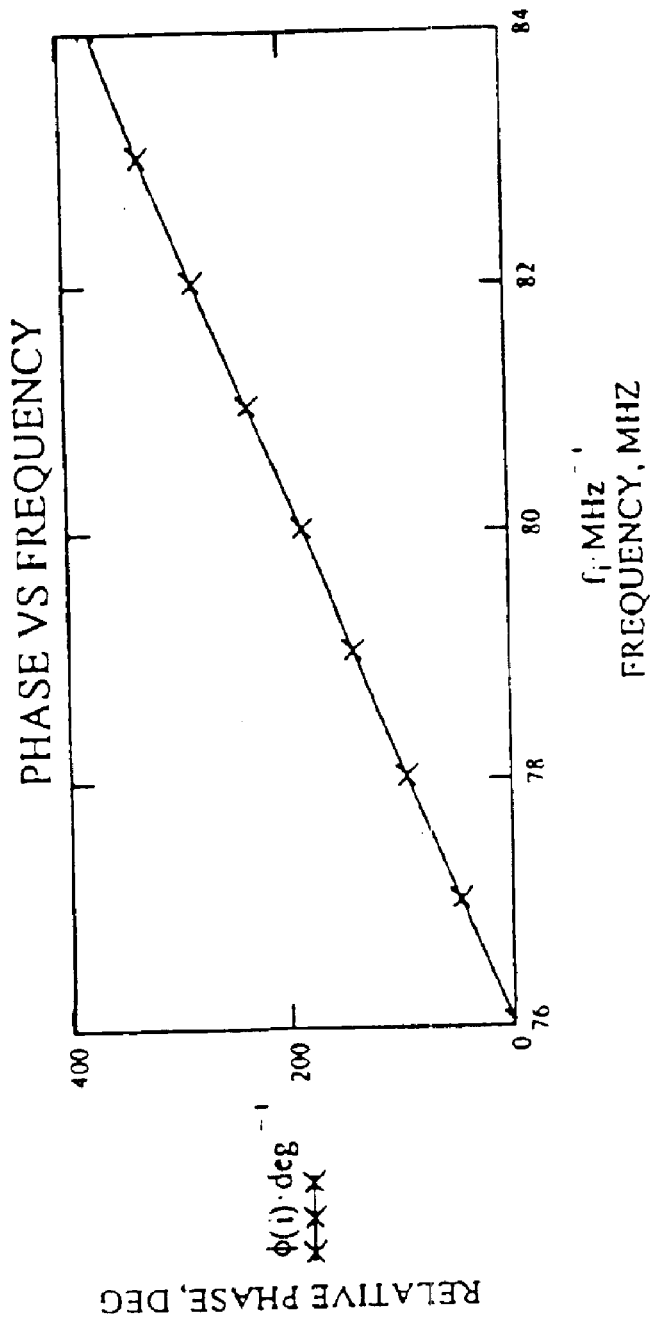
FIG. 11 is an exemplary chart of the data of FIG. 10 modified in accordance with a phase ambiguity algorithm of the present invention.

The modified data is then plotted using the parameters of a line $\Phi_1:=\phi(i); m:=\text{slope}(f,\Phi); b:=\text{intercept}(f,\Phi); y(i):=mf_i+b$ to provide the phase v. frequency line shown in FIG. 11. The distance D in meters is determined from the slope (m) of the phase v. frequency line which is proportional to the delay T, i.e. $T=m/2\pi$;. In the example of FIG. 11, D:=cT, where $c:=3\times10^8$ m/s and T:=$m/2\pi$. Consequently, for the line illustrated in FIG. 11, T=130 ns resulting in a distance D=39 m. Subsequently, the calculated distance data can be used to implement any number of distance-based processes as described above.

Figure 7:
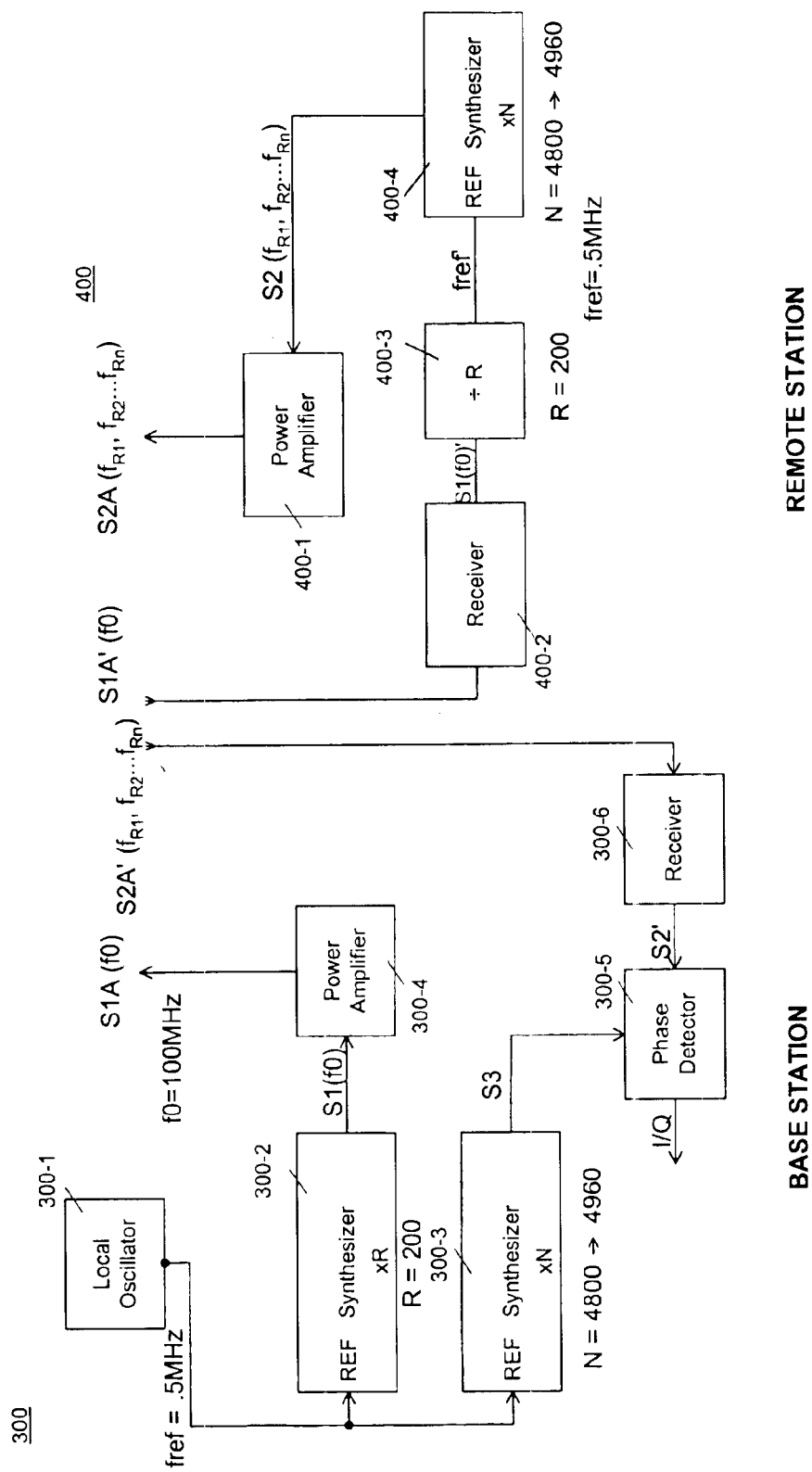
FIG. 7 is an illustrative functional block diagram of a base station and remote unit in accordance with an embodiment of the present invention.

FIG. 7 is a functional block diagram of a second embodiment of the present invention. This embodiment can operate either in half-duplex or in full-duplex modes. FIG. 7 illustrates transceiver circuitry that may be included in the RF transceiver portion of base station 300 and the remote station 400. As shown, the base station 300 includes a local oscillator 300-1, synthesizer 300-2, synthesizer 300-3, power amplifier 300-4, phase detector 300-5, and receiver 300-6. Local oscillator 300-1 generates a system clock, or reference signal $f_{ref}$, which is coupled to the reference inputs of synthesizers 300-2 and 300-3. In this example, $f_{ref}=0.5$ MHz.

Synthesizer 300-2 generates a single carrier signal S1($f_0$), which is coupled to the input of power amplifier 300-5. S1($f_0$) is a multiple of the reference frequency $f_{ref}$. In this example, synthesizer 300-2 multiplies $f_{ref}$ by an integer value R, where R=200. Power amplifier 300-4 amplifies S1($f_0$) and produces amplified signal S1A($f_0$), which may be, for example, 100 MHz. Signal S1A($f_0$) is propagated over distance D to the remote unit 400. Synthesizer 300-3 generates an FHSS signal S3, which is comprised of a sequence of carriers at different frequencies. Each carrier is a multiple of the reference frequency $f_{ref}$. In this example, $f_{ref}$ is multiplied by a sequence of integers N, where N varies between 4800 and 4960. As previously mentioned, N need not vary in ascending or descending order.

Receiver 300-6 receives external FHSS signal S2A' (transmitted from remote station 200) to produce return signal S2'. Signal S2' is comprised of a sequence of phase shifted carriers corresponding to FHSS signal S3 generated by synthesizer 300-3. Further, the sequence of carriers of FHSS signal S2' are equal in frequency to the sequence of carriers of signal S3 generated by the synthesizer 300-3. Signals S2' and S3 are coupled to the inputs of phase detector 300-5 for phase comparison. Phase detector 300-5 generates a sequence of DC I/Q outputs corresponding to the carriers of S2' and S3. The internal details of phase detector 300-5 are the same as described in the previous embodiment.

Also shown in FIG. 7 is the remote station 400. Remote station 400 includes a receiver 400-2, divider 400-3, synthesizer 400-4, and power amplifier 400-1. The receiver 400-2 receives single carrier signal S1A'($f_0$) from the base station 300 to produce S1'($f_0$). Divider 400-3 divides signal S1'($f_0$) to produce reference signal $f_{ref}$. For purposes of example, R=200. Reference signal $f_{ref}$ is coupled to the input of synthesizer 400-4. Synthesizer 400-4 multiplies $f_{ref}$ by a sequence of integers N to generate FHSS signal S2, which is comprised of a sequence of frequencies $f_{r1}, f_{r2}, \ldots f_m$. In this example, N is a sequence of integers between 4800 and 4960. Signal S2 is coupled to the input of power amplifier 400-1, amplified, and transmitted to receiver 300-6 in the RF transceiver 300 of the base station.

As shown in FIG. 7, single carrier signal S1A($f_0$) is transmitted from transceiver 300 to remote station 200. As will be described, this embodiment does not require that a spread spectrum signal be used for the outgoing transmission from the base station. Further, the invention could be modified to work with a modulated carrier transmitted from the base station, although modulation is not a requirement for this embodiment As shown in FIG. 7, signal S1A' is received at the remote unit 400 by receiver 400-2 to produce single frequency signal S1($f_0$)'. S1($f_0$)' is then used by the divider to generate a reference signal $f_{ref}$. Reference signal $f_{ref}$ is used to synchronize a VCO in synthesizer 400-4 to generate S2 which is comprised of a sequence of carriers ($f_{r1}, f_{r2}, \ldots f_m$). FHSS signal S2 is amplified by power amplifier 400-1 to generate signal S2A and transmitted back to the RF transceiver 300 of the base station.

At the base station transceiver 300, FHSS signal S2A' is received by receiver 103-7 and amplified to produce FHSS signal S2'. Signal S2' is phase compared with the signal S3 originally generated by synthesizer 300-3. As in the previous embodiment, phase comparison is performed by generating In-phase (I) and Quadrature (Q) DC signals and performing a simple arithmetic calculation to find the phase shift. I/Q data is stored in memory 105 of the processor 102 (shown in FIG. 3). After I/Q data is collected for a sufficient number of adjacent carrier frequencies, CPU 104 executes the distance measurement algorithm described in the previous embodiment. Notably, in the second embodiment, the carrier frequency of S1A($f_0$) was different from the frequencies comprising S2A. Consequently, the second embodiment is well suited for, but not limited to, full duplex operation. Further, as mentioned before, any transceiver implementation that provides for phase detection of equal frequency signals is sufficient.

Figures 8, 9:
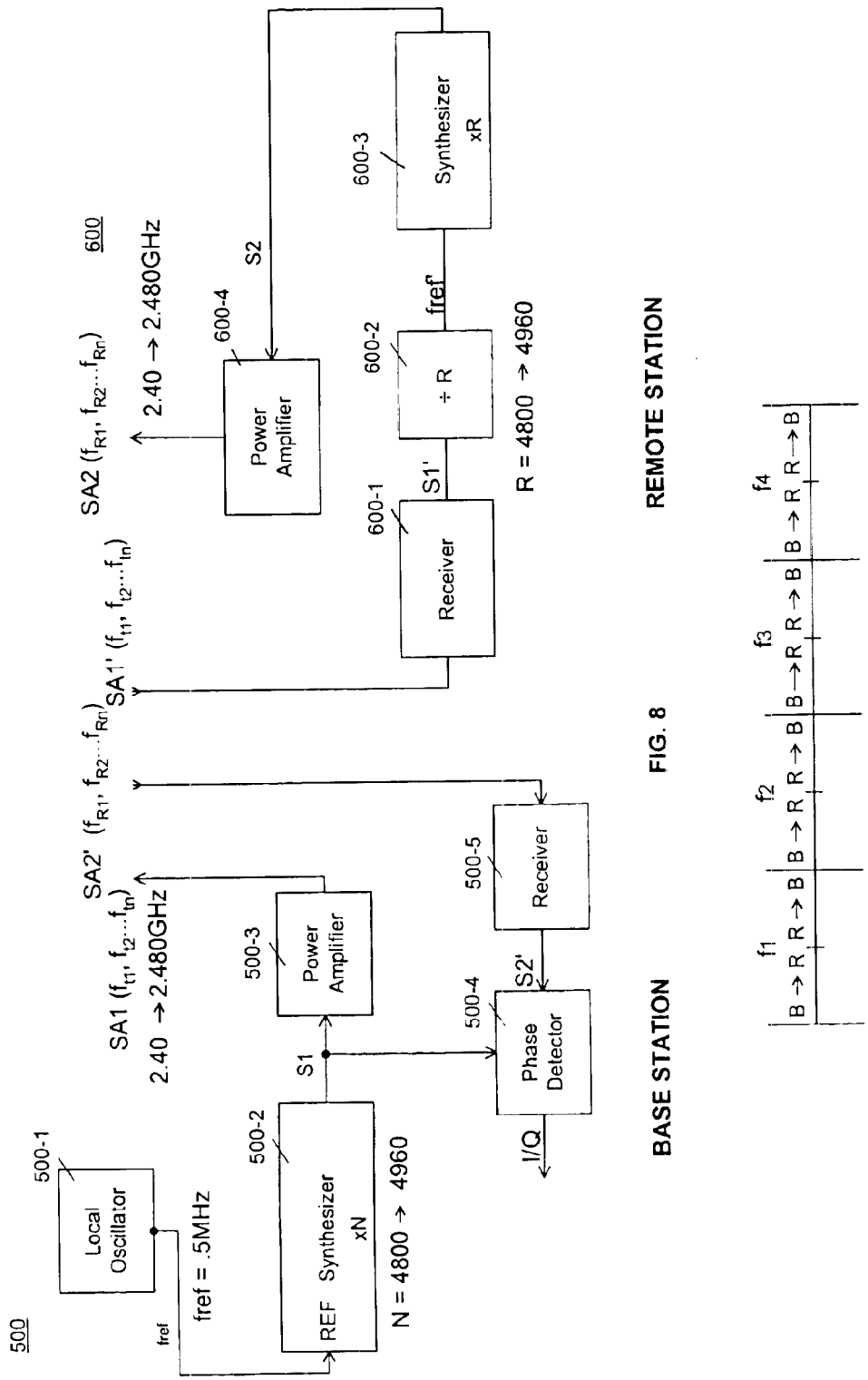
FIG. 8 is an illustrative functional block diagram of a base station and remote unit in accordance with an embodiment of the present invention.
FIG. 9 is an exemplary timing diagram showing one possible timing sequence of the transmission between a base station and a remote station of FIG. 8.

FIG. 8 is a function block diagram of a further embodiment of the present invention. FIG. 8 illustrates circuitry that may be included in the base station transceiver 500 and the remote station 600. As shown, the base station transceiver 500 includes a local oscillator 500-1, synthesizer 500-2, power amplifier 500-3, phase detector 500-4, and receiver 500-5. Local oscillator 500-1 generates a system clock, or reference frequency $f_{ref}$, which is coupled to the reference input of synthesizer 500-2. N this example, $f_{ref}$ is set to 0.5 MHz.

Synthesizer 500-2 generates a frequency hopping spread spectrum (FHSS) signal S1, which is comprised of a sequence of carriers at different frequencies. Each carrier is a multiple of the reference frequency $f_{ref}$. In this example, the multiplication factor N is used by synthesizer 500-2, and is a sequence of values between 4800 and 4960. Signal S1 is coupled to the input of power amplifier 500-3. Power amplifier 500-3 amplifies signal S1 and produces amplified FHSS signal S1A. Signal S1A is propagated over distance D to the remote unit 600.

Receiver 500-5 receives external FHSS signal S2A' (transmitted from remote station 600). Signal S2A' is comprised of a sequence of phase shifted carriers corresponding to the carriers of signal S1 generated by synthesizer 500-2. Further, the sequence of carriers of signal FHSS S2A' are equal in frequency to the sequence of carriers of signal S1 generated by the synthesizer 500-2. Signal S2' and S1 are coupled to the inputs of phase detector 500-4 for phase comparison. Phase detector 500-4 generates a sequence of DC I/Q outputs corresponding to the carriers of S2'.

Also shown in FIG. 8 is the remote station 600. Remote station 600 includes a receiver 600-1, divider 600-2, synthesizer 600-3, and power amplifier 600-4. The receiver 600-1 receives FHSS signal S1A' (comprised of a sequence of carriers having frequencies $f_{r1}, f_{r2}, \ldots f_m$) from the base station RF transceiver 500 and generates signal S1'. Divider 600-2 divides S1' by a factor R to generate a sequence of reference signals $f_{ref}'$. For purposes of example, let R sequence through the range of integers 4800=>4960. Reference signal $f_{ref}'$ is coupled to the input of synthesizer 600-3. Synthesizer 600-3 multiplies $f_{ref}$ to generate FHSS signal S2, which is comprised of a sequence of frequencies $f_{r1}, f_{r2}, \ldots f_m$. FHSS signal S2 is coupled to the input of power amplifier 600-1, amplified, and transmitted to receiver 500-5 of base station transceiver 500.

The operation of this embodiment will be described with reference to FIGS. 8–9. As shown in FIG. 8, FHSS signal S1A is transmitted from base station transceiver 500 to remote unit 600. As shown in the timing diagram of FIG. 9, the S1A is comprised of a sequence of carriers f1, f2, f3 . . . fn. To implement a half-duplex system, where the return transmit carriers have the same frequency as the base station transmit carriers, transmit and receive operations must be time multiplexed. In this example, the carrier of S1A having a frequency of $f_0$ is transmitted by the base station to the remote station during a first time interval (B=>R). Subsequently, the same phase-shifter carrier is received by the base station during a second time interval (R=>B). Next, $f_1$ is transmitted and received during alternating time intervals (B=>R) and (R=>B). In this way, the base station and remote station can utilize the same transmit band without interference.

The half-duplex transmission scheme described herein need not transmit carrier frequencies in incrementing order, and in practice, the sequential order of carrier frequency transmission may be quite random. In operation, it is only necessary that the base station and the remote station follow the same hopping sequence of carrier frequencies. Many other transmission schemes are known and could take advantage of other variation of the half-duplex operation of this embodiment of the present invention.

As shown in FIG. 8, once the signal S1A' is received at the remote unit 600 by receiver 600-1, it is divided down by divider 600-2 to generate the reference frequency $f_{ref}'$. Divider 600-2 includes a phase locked loop for generating $f_{ref}'$. The phase locked loop contains a VCO which is locked by the input signal S1'. In this example, the dividing factor R is selected from a sequence of integers ranging from 4800 to 4960. Each integer is selected according to the given transmit frequency. After the transmission of signal S1A($f_o$) from the transceiver 500 of the base station ceases, divider 600-2 maintains the control voltage on the VCO such that the reference signal $f_{ref}$ continues with minimal frequency and phase drift. One or more techniques to maintain a stable reference signal after the input locking signal ceases to exist can be implemented, for example, as suggested in related U.S. Application No. [Attorney Docket No. 52625-5002], filed concurrently herewith and expressly incorporated by reference herein.

Reference signal $f_{ref}$ contains the phase information of the received signal S1'. It can therefore be used to synchronize a VCO within the synthesizer 600-3. More specifically, the signal $f_{ref}'$ is used as a reference signal for the synthesizer 600-3 to generate signal S2 comprising carriers having frequencies ($f_{r1}$, $f_{r2}$, ... $f_m$). Each of the frequencies of S2 are phase coherent with reference signal $f_{ref}'$. After transmission of S1 by the base station transceiver 500 is complete, return signal S2 is amplified by power amplifier 600-1 to generate signal S2A and transmitted back to the base station transceiver 500.

At base station 500, FHSS signal S2A' is received and by receiver 500-5 and amplified to produce signal S2'. Signal S2' is phase compared with the S1 originally generated signals by synthesizer 500-2. The phase comparison is performed by the same methods previously described.

Figure 12:
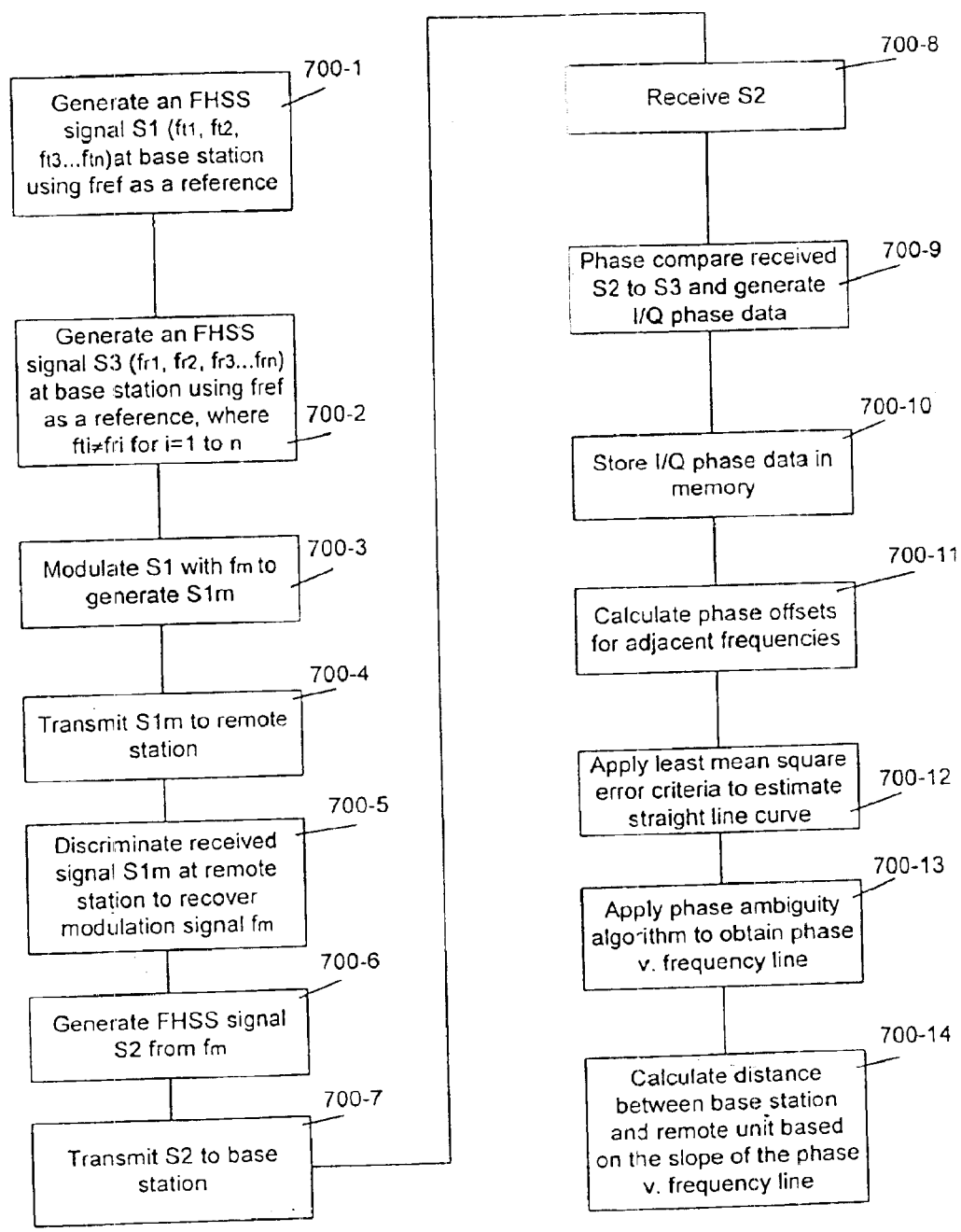
FIG. 12 is an illustrative flowchart of the steps for measuring the distance between two objects in accordance with an embodiment of the present invention.

There are any number of physical implementations capable of practicing the inventive methods described herein. For example, FIG. 12 illustrates the process steps used to perform distance measurement in accordance with an embodiment of the present invention. The steps could be applied to any number of system implementations. While steps 700-1 through 700-14 will produce the desired result, i.e. an accurate distance measurement between a base station and a remote station, the invention may be practiced without including each and every step shown.

At step 700-1, a first FHSS signal is generated at a base station. At step 700-2, a third FHSS signal is generated at the base station. The third FFHS signal has a different frequency structure than the first FHSS signal. As will be discussed below, step 700-2 is not required. Step 700-3 involves modulating the first FHSS signal with a modulation signal $f_m$. The modulated signal is transmitted to a remote station in step 700-4.

At step 700-5, the modulation signal $f_m$ is recovered at the remote station. For example, the received signal may be discriminated at the remote station to recover the modulation signal. As noted above, the modulated signal $f_m$ received at the remote station approximates the signal $f_m$ transmitted by the base station time-shifted as a result of the transmission delay. Step 700-6 includes generating a second FHSS signal using the recovered modulation signal $f_m$ as a reference signal. At step 700-7, the remote station transmits the second FHSS signal to the base station. At step 700-8, the base station receives the second FHSS signal. At step 700-9, the phase of the second and third FHSS signal are compared to generate I/Q phase data. Alternatively, the received second FFHS signal may be converted to a time-delayed version of the first FFHS signal. In such a case, the first FFHS signal and the time-delayed version may be compared. Moreover, both of the first and second FFHS signals may be converted to a fourth and fifth FFHS signals for comparison. The above steps may be repeated several times to obtain multiple data points for statistical correction.

Step 700-10 includes storing I/Q data in memory. At step 700-11, the phase offsets for adjacent frequencies are calculated. At step 700-12, a straight line curve is estimated using the phase offsets. Of course, a straight line curve need not be actually plotted, but the estimation may be performed by manipulating data sets. For example, a least mean square error criteria may be used to estimate the straight line curve. At step 700-13, a phase ambiguity algorithm is applied to obtain phase v. frequency line. As above, the phase v. frequency line need not be actually plotted, but may be represented in data. Finally, at step 700-14, the distance between the base station and the remote station is calculated based on the slope of the phase/frequency line.

Figure 13:
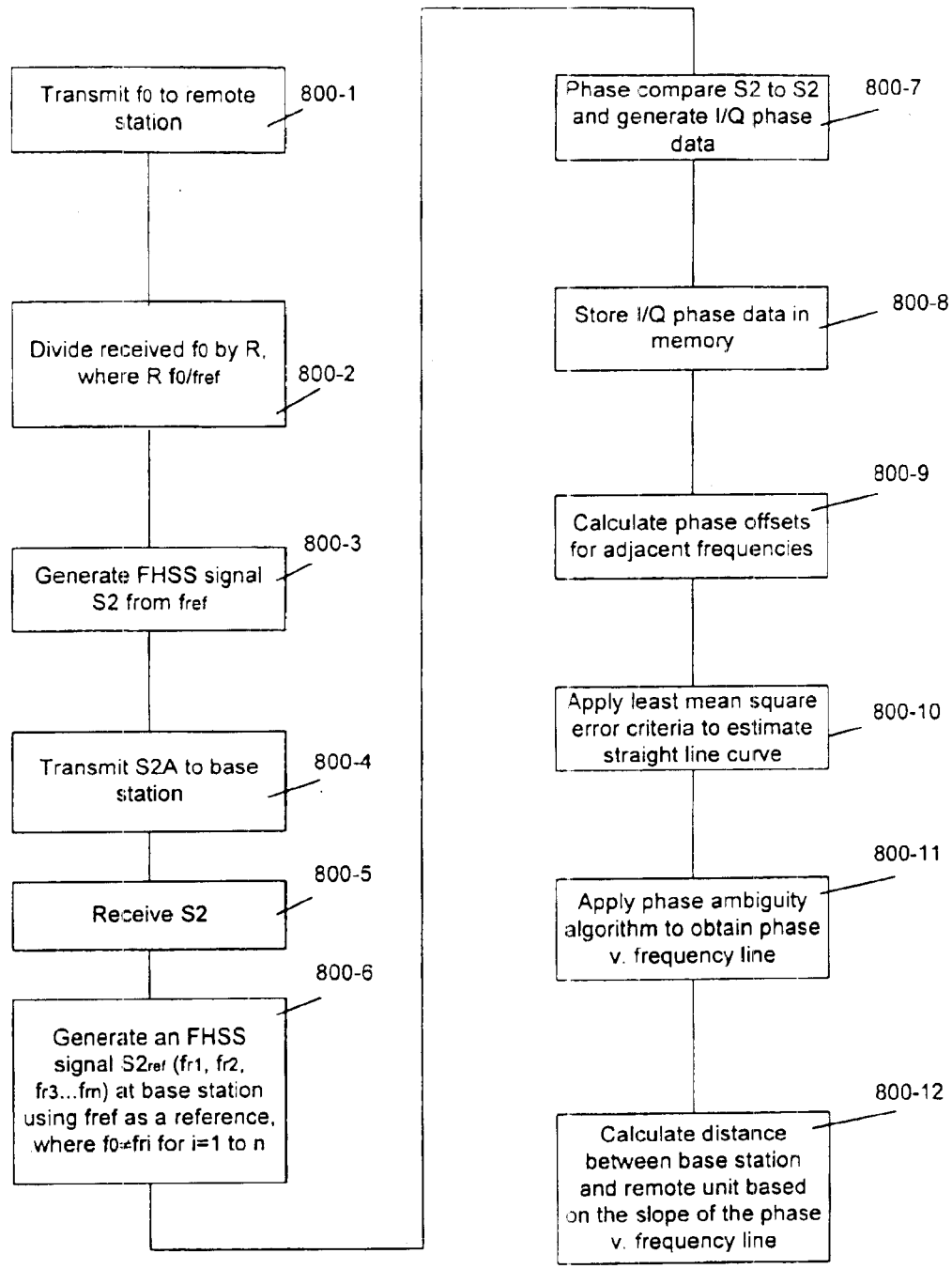
FIG. 13 is an illustrative flowchart of the steps for measuring the distance between two objects in accordance with an embodiment of the present invention.

FIG. 13 illustrates the process steps used in performing distance measurement in accordance with an embodiment of the present invention. As above, the steps could be applied to any number of system implementations. While steps 800-1 through 800-13 will produce the desired result, i.e. an accurate distance measurement between a base station and a remote station, the invention may be practiced without including each and every step shown.

Step 800-1 includes transmitting a single frequency carrier from a base station to a remote station. At the remote station, a reference signal is generated by dividing the received single carrier signal by a constant, as shown in step 800-2. At step 800-3, an FHSS signal is generated from the reference signal. The FHSS signal is transmitted from the remote to the base station at step 800-4 and received at the base station at step 800-5. Step 800-6 includes generating another FHSS signal at the base station that is phase coherent with the single carrier signal. At step 800-7, the phases of the two FHSS signals are compared to generate I/Q phase data. At step 800-8, the I/Q data is stored in memory. Step 800-9 includes calculating phase offsets for adjacent frequencies. At step 800-10, a straight line curve is estimated, e.g., using a least mean square error criteria. As above, the straight line curve may be represented in data. Step 800-11 includes applying a phase ambiguity algorithm to obtain phase v. frequency line. Step 800-12 includes calculating the distance between the base station and the remote station based on the slope of the phase/frequency line.

Figure 14:
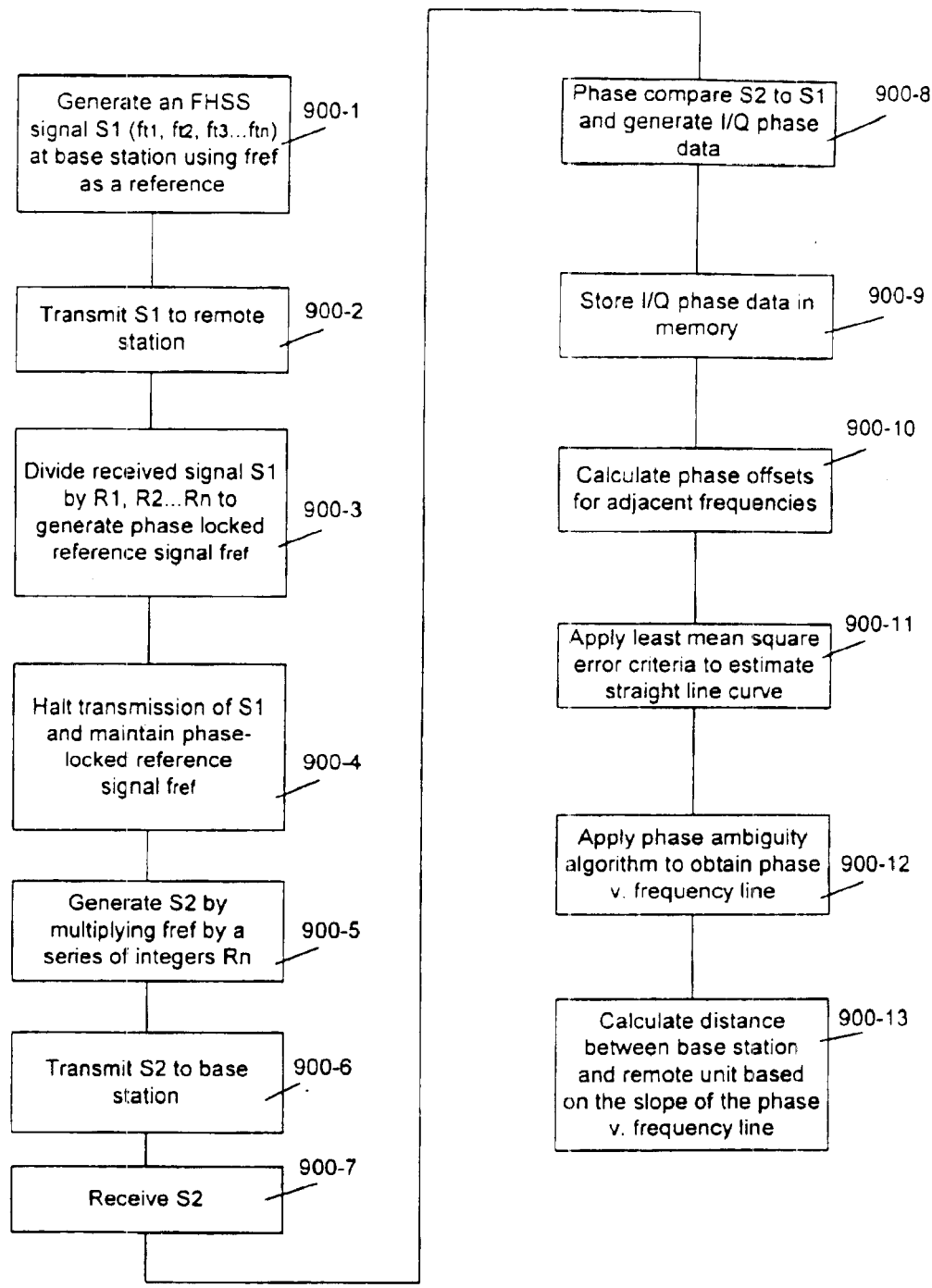
FIG. 14 is an illustrative flowchart of the steps for measuring the distance between two objects in accordance with an embodiment of the present invention.

FIG. 14 illustrates the process steps used in performing distance measurement in accordance with an embodiment of the present invention. The steps could be applied to any number of system implementations. While steps 900-1 through 900-13 will produce the desired result, i.e. an accurate distance measurement between a base station and a remote station, the invention may be practiced without including each and every step shown.

Step 900-1 includes generating a first FHSS signal at a base station. At step 900-2, the first FHSS signal is transmitted to a remote station. At the remote station, the received FHSS signal is divided by a series of integers to generate a reference signal, as provided in step 900-3. Step 900-4 includes halting the transmission of the first FHSS signal and maintaining the reference signal. Step 900-5 includes multiplying the reference signal by a series of constants to produce a second FHSS signal. The multiplied second FHSS signal is transmitted to the base station at step 900-6 and received at the base station at step 900-7. At step 900-8, the phase of the first and second FHSS signals are compared to generate I/Q phase data. Step 900-9 includes storing the I/Q data in memory and step 900-10 includes calculating phase offsets for adjacent frequencies. At step 900-11, a straight-line curve is estimated, e.g., using least mean square error criteria. Step 900-12 includes applying a phase ambiguity algorithm to obtain phase v. frequency line. The distance between the base station and the remote station is calculated based on the slope of the phase/frequency line at step 900-13.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wireless communication device, comprising:
    a first synthesizer for generating a first radio frequency (RF) signal, the first RF signal including a sequence of carriers;
    a transmitter for transmitting the first RF signal;
    a receiver for receiving a second RF signal from a remote wireless device phase locked with the first wireless device, the second RF signal including a sequence of carriers corresponding to the carriers of the first RF signal, wherein the frequencies of the corresponding sequence of carriers of the first RF signal are different from the frequencies of the sequence of carriers of the second RF signal;
    a second synthesizer for generating a third RF signal, the third RF signal including a sequence of carriers corresponding to the carriers of the first and second RF signals, wherein the phase of the third RF signal is coherent with the phase of the first RF signal, and wherein the frequencies of the sequence of carriers of the second RF signals are the same as the frequencies of the sequence of carriers of the third RF signal;
    a phase detector for comparing the phase of each of the carriers of the second RF signal to the phase of each of the corresponding carriers of the third RF signal and generating a sequence of phase offsets; and
    a processor for determining distance between the wireless communication device and the remote wireless device by calculating an estimated slope of the sequence of phase offsets relative to the frequencies of the sequence of carriers of the second RF signal, wherein the phase detector generates the phase offsets by producing In-phase (I) and Quadrature (Q) signals by mixing the received second RF signal with the third RF signal, and wherein the processor solves for phase angle $\Theta$ by applying the following relationship: $\Theta=\text{Arctan}(Q/I)/2$.

2. The wireless communication device according to claim 1, wherein the sequence of carriers produced by the synthesizer are modulated with a modulation signal, and wherein the phase of the modulation signal is coherent with each of the phases of the sequence of carriers of the first RF signal.

3. The wireless communication device according to claim 1, wherein the phase detector comprises:
    a first mixer for mixing the sequence of carriers of the third RF signal with the corresponding sequence of carriers of the received second RF signal, wherein the first mixer outputs a sequence of DC in-phase components I;
    a phase shifter for shifting the phase of the sequence of carriers of the third RF signal by 90 degrees; and
    a second mixer for mixing the sequence of 90 degree phase-shifted carriers with the corresponding sequence of carriers of the received second RF signal, wherein the second mixer outputs a sequence of DC quadrature-phase signals Q, wherein the I and Q components are used to calculate the phase offsets of each of the sequence of carriers of the second RF signal, and wherein the phase offsets are used to calculate the distance between the wireless communication device and the remote wireless device.

4. The wireless communication device according to claim 1, wherein the processor calculates the slope by executing a phase ambiguity algorithm to produce a relative phase offset $\Phi$ among the carrier frequencies of the received second RF signal such that $$\Phi(n):=0 \text{ if } n=0;$$

otherwise, $$\Phi(n):=(\Theta_n-\Theta_{n-1})+\Phi(n-1)+\pi \text{ if } \Theta_n-\Theta_{n-1}<0$$

$$\Phi(n):=(\Theta_n-\Theta_{n-1})+\Phi(n-1) \text{ otherwise}$$

where $\Theta_n$ is the phase offset for each carrier of the received second RF signals.

5. The wireless communication device of claim 1, wherein the wireless communication device transmits information to the remote wireless device based on the distance between the wireless communication device and the remote wireless device.

6. The wireless communication device of claim 1, wherein the wireless communication device and the remote wireless device transfer data to each other to complete a commercial transaction.

7. The wireless communication device of claim 1, wherein the wireless communication device determines its location based on the calculated distance from the remote wireless device.

8. The wireless communication device according to claim 1, wherein the phase detector comprises:
    a first mixer for mixing the sequence of carriers of the third RF signal with the corresponding sequence of carriers of the received second RF signal, wherein the first mixer outputs a sequence of DC in-phase components;
    a phase shifter for shifting the phase of the sequence of carriers of the third RE signal by 90 degrees; and
    a second mixer for mixing the sequence of 90 degree phase-shifted carriers with the corresponding sequence of carriers of the received second RF signal, wherein the second mixer outputs a sequence of DC quadrature-phase signals Q, wherein the I and Q components are used to calculate the phase offsets of each of the sequence of carriers of the frequency-converted second RF signal, and wherein the phase offsets are used to calculate the distance between the wireless communication device and the remote wireless device.

9. The wireless communication device according to claim 2, wherein the wireless communication device further comprises:
    a local oscillator for generating a reference signal used to synchronize the first and second synthesizer; and
    a frequency divider for dividing the reference signal to generate the modulation signal.

10. The wireless communication device according to claim 2, wherein the wireless communication device further comprises:
    a local oscillator for generating a reference signal used to synchronize the first and second synthesizers; and
    a frequency divider for dividing the reference signal to generate the modulation signal.

11. The wireless communication device of claim 4, wherein the following relationships are used by the processor to calculate the distance between the wireless communication device and the remote wireless device: $D:=cT$, with $c:=3\times10^8$ m/s and $T:=m/2\pi$, where m is the slope of the relative phase shift (Φ) v. frequency line and D is the distance between the wireless communication device and the remote wireless device.

12. A wireless communication device, comprising:
a first synthesizer for generating a first radio frequency (RF) signal, the first RF signal including a single carrier having a frequency ft0;
a transmitter for transmitting the first RF signal;
a receiver for receiving a second RF signal from a remote wireless device phase locked with the first wireless device, the second RF signal including a sequence of carriers, wherein the frequencies of the sequence of carriers of the second RF signal are different from ft0;
a second synthesizer for generating a third RF signal, the third RF signal including a sequence of carriers corresponding to the carriers of the second RF signal, wherein the phase of the third RF signal is coherent with the phase of the first RF signal, and wherein the frequencies of the sequence of carriers of the second RF signal are the same as the frequencies of the sequence of carriers of the third RF signal;
a phase detector for comparing the phase of each of the carriers of the second RF signal to the phase of each of the carriers of the third RF signal to generate a corresponding sequence of phase offsets; and
a processor for determining distance between the wireless communication device and the remote wireless device by calculating an estimated slope of the phase offsets relative to the frequencies of the sequence of carriers of the second RF signal, wherein the phase detector generates the phase offsets by producing In-phase (I) and Quadreture (Q) signals by mixing the received second RF signal with the third RF signal, and wherein the processor solves for phase angle Θ by applying the following relationship: Θ=Arctan(Q/I)/2.

13. The wireless communication device according to claim 12, wherein the sequence of carriers produced by the synthesizer are modulated with a modulation signal.

14. The wireless communication device according to claim 12, wherein the processor calculates the slope by executing a phase ambiguity algorithm to produce a relative phase offset Φ among the carrier frequencies of the received second RE signal such that $\Phi(n):=0$ if $n=0$;

otherwise, $\Phi(n):=(\theta_n-\theta_{n-1})+\Phi(n-1)+\pi$ if $\theta_n-\theta_{n-1}<0$ $\Phi(n):=(\theta_n-\theta_{n-1})+\Phi(n-1)$ otherwise where $\theta_n$ is the phase offset for each carrier of the received second RF signals.

15. The wireless communication device of claim 12, wherein the wireless communication device transmits information to the remote wireless device based on the distance between the wireless communication device and the remote wireless device.

16. The wireless communication device of claim 12, wherein the wireless communication device and the remote wireless device transfer data to each other to complete a commercial transaction.

17. The wireless communication device of claim 12, wherein the wireless communication device determines its location based on the calculated distance from the remote wireless device.

18. The wireless communication device of claim 14, wherein the following relationships are used by the processor to calculate the distance between the wireless communication device and the remote wireless device: D:=cT, with c:=3×10$^8$ m/s and T:=m/2π, where m is the slope of the relative phase shift (Φ) v. frequency line and D is the distance between the wireless communication device and the remote wireless device.

19. A computer readable medium containing program instructions for controlling a wireless communication device and for determining distance between the wireless communication device and a remote wireless device, comprising instructions for:
generating a first radio frequency (RF) signal, the first RF signal including a sequence of carriers;
transmitting the first RF signal;
receiving a second RF signal from a remote wireless device phase locked with the wireless communication device, the second RF signal including a sequence of carriers corresponding to the carriers of the first RF signal, wherein the frequencies of the sequence of carriers of the first RF signal are different from the frequencies of the sequence of carriers of the second RF signal;
generating a third RF signal, the third RF signal including a sequence of carriers corresponding to the carriers of the first and second RF signals, wherein the phase of the third RF signal is coherent with the phase first RF signal, and wherein the frequencies of the sequence of carriers of the second RF signal are the same as the frequencies of the sequence of carriers of the third RF signal;
comparing the phase of each of the carriers of the second RF signal to the phase of each of the corresponding carriers of the third RF signal to generate a sequence of phase offsets;
calculating an estimated slope of the phase offsets relative to the frequencies of the sequence of carriers of the second RF signal, wherein the estimated slope is proportional to the distance between the wireless communication device and the remote device;
mixing the received second RF signal with the third RF signal to produce In-phase (I) and Quadrature (Q) signals;
solving for phase angle Θ by applying the following relationship: Θ=Arctan(Q/I)/2; and
calculating the phase offset based on phase angle θ.

20. The computer readable medium of claim 19, further comprising instructions for modulating the sequence of carriers produced by the first synthesizer of the wireless communication device with a modulation signal, wherein the phase of the modulation signal is coherent with each of the phases of the sequence of carriers of the first RE signal.

21. The computer readable medium of claim 19, further comprising instructions for:
mixing the sequence of carriers of the third RF signal with the sequence of corresponding carriers of the received second RF signal to generate a sequence of DC in-phase components I;
shifting the phase of the sequence of carriers of the third RF signal by 90 degrees; and
mixing the sequence of 90 degree phase-shifted carriers with the corresponding sequence of carriers of the received second RF signal to generate a sequence of DC quadrature-phase signals Q;

calculating the phase offsets of each of the carriers of the second RF signal using the I and Q components; and calculating the distance between the wireless communication device and the remote wireless device using the phase offsets.

22. The computer readable medium of claim 19, further comprising instructions for calculating the slope by executing a phase ambiguity algorithm to produce a relative phase offset among the carrier frequencies of the received second RF signal such that $\Phi(n):=0$ if $n=0$;

otherwise, $\Phi(n):=(\theta_n-\theta_{n-1})+\Phi(n-1)+\pi$ if $\theta_n-\theta_{n-1}<0$ $\Phi(n):=(\theta_n-\theta_{n-1})+\Phi(n-1)$ otherwise where $\theta_n$ is the phase offset for each carrier of the received second RF signal.

23. The computer readable medium of claim 19, further comprising instructions transmitting information to the remote wireless device based on the distance between the wireless communication device and the remote wireless device.

24. The computer readable medium of claim 19, further comprising instructions transferring data between the wireless communication device and the remote wireless device to complete a commercial transaction based on the distance between the wireless communication device and the remote wireless device.

25. The computer readable medium of claim 19, further comprising instructions for determining the location of the wireless communication device based on the calculated distance from the remote wireless device.

26. The computer readable medium of claim 19, further comprising instructions for transmitting information to the remote wireless device based on the distance between the wireless communication device and the remote wireless device.

27. The computer readable medium of claim 19, further comprising instructions for transferring data to between the wireless communication device and the remote wireless device to complete a commercial transaction based on the calculated distance.

28. The computer readable medium of claim 20, further comprising instructions for:

generating a reference signal used to synchronize the first and second synthesizers; and dividing the reference signal to generate the modulation signal.

29. The computer readable medium of claim 22, wherein the instructions use the following relationships to calculate the distance between the wireless communication device and the remote wireless device: $D:=cT$, with $c:=3\times10^8$ m/s and $T:=m/2\pi$, where m is the slope of the relative phase shift ($\Phi$) v. frequency line and D is the distance between the wireless communication device and the remote wireless device.

30. The computer readable medium of claim 22, wherein the instructions use the following relationships to calculate the distance between the wireless communication device and the remote wireless device: $D:=cT$, with $c:=3\times10^8$ m/s and $T:=m/2\pi$, where m is the slope of the relative phase shift ($\Phi$) v. frequency line and D is the distance between the wireless communication device and the remote wireless device.

31. A computer readable medium containing program instructions for controlling a wireless communication device and for determining distance between the wireless communication device and a remote wireless device, comprising instructions for:

generating a first radio frequency (RF) signal, the first RF signal including a single carrier having a frequency ft0;

transmitting the first RF signal;

receiving a second RF signal from a remote wireless device phase locked with the remote wireless device, the second RF signal including a sequence of carriers, wherein the frequencies of the sequence of carriers of the second RF signal are different from ft0;

generating a third RF signal, the third RF signal including a sequence of carriers corresponding to the carriers of the second RF signal, wherein the phase of the third RF signal is coherent with the phase of the first RF signal, and wherein the frequencies of the corresponding sequence of carriers of the second RF signal are the same as the frequencies of the corresponding sequence of carriers of the third RF signal;

comparing the phase of each of the carriers of the second RF signal to the phase of each of the corresponding carriers of the third RF signal to generate a sequence of phase offsets;

calculating an estimated slope of the phase offsets relative to the frequencies of the sequence of carriers of the second RF signal, wherein the estimated slope is proportional to the distance between the wireless communication device and the remote wireless device;

mixing the received second RF signal with the third RF signal to produce In-phase (I) and Quadrature (Q) signals;

solving for phase angle $\Theta$ by applying the following relationship: $\Theta=\text{Arctan}(Q/I)/2$; and calculating the phase offset based on phase angle $\theta$.

32. The computer readable medium of claim 31, further comprising instructions for modulating the sequence of carriers produced by the first synthesizer of the wireless communication device with a modulation signal, wherein the phase of the modulation signal is coherent with each of the phases of the sequence of carriers of the first RE signal.

33. The computer readable medium of claim 31, further comprising instructions for:

mixing the sequence of carriers of the third RF signal with the sequence of corresponding carriers of the received second RF signal to generate a sequence of DC in-phase components I;

shifting the phase of the sequence of carriers of the third RF signal by 90 degrees; and mixing the sequence of 90 degree phase-shifted carriers with the corresponding sequence of carriers of the received second RF signal to generate a sequence of DC quadrature-phase signals Q;

calculating the phase offsets of each of the carriers of the second RF signal by using the I and Q components; and calculating the distance between the wireless communication device and the remote wireless device using the phase offsets.

34. The computer readable medium of claim 31, further comprising instructions for calculating the slope by executing a phase ambiguity algorithm to produce a relative phase offset among the carrier frequencies of the received second RF signal such that $\Phi(n):=0$ if $n=0$;

otherwise, $\Phi(n):=(\theta_n-\theta_{n-1})+\Phi(n-1)+\pi$ if $\theta_n-\theta_{n-1}<0$ $\Phi(n):=(\theta_n-\theta_{n-1})+\Phi(n-1)$ otherwise where $\theta_n$ is the phase offset for each carrier of the received second RF signals.

35. The computer readable medium of claim 31, further comprising instructions for determining the location of the wireless communication device based on its calculated distance from the remote wireless device.

36. The computer readable medium of claim 32, further comprising instructions for:

generating a reference signal used to synchronize the first and second synthesizers; and dividing the reference signal to generate the modulation signal.

37. A method of determining distance between a wireless communication device and a remote wireless device, the method comprising the steps of:

generating a first radio frequency (RF) signal, the first RF signal including a sequence of carriers;

transmitting the first RF signal;

receiving a second RF signal from a remote wireless device phase locked with the wireless communication device, the second RF signal including a sequence of carriers corresponding to the carriers of the first RF signal, wherein the frequencies of the sequence of carriers of the first RF signal are different from the frequencies of the sequence of carriers of the second RF signal;

generating a third RF signal, the third RF signal including a sequence of carriers corresponding to the carriers of the first and second RF signals, wherein the phase of the third RF signal is coherent with the phase first RF signal, and wherein the frequencies of the sequence of carriers of the second RF signal are the same as the frequencies of the sequence of carriers of the third RF signal;

comparing the phase of each of the carriers of the second RF signal to the phase of each of the corresponding carriers of the first of the third RF signal to generate a sequence of phase offsets;

calculating an estimated slope of the phase offsets relative to the frequencies of the sequence of carriers of the second RF signal, wherein the estimated slope is proportional to the distance between the wireless communication device and the remote wireless device;

mixing the received second RF signal with the third RF signal to produce In-phase (I) and Quadrature (Q) signals;

solving for phase angle $\Theta$ by applying the following relationship: $\Theta=\text{Arctan}(Q/I)/2$; and calculating the phase offset based on phase angle $\theta$.

38. The method according to claim 37, further comprising the step of modulating the sequence of carriers produced by the first synthesizer of the wireless communication device with a modulation signal, wherein the phase of the modulation signal is coherent with each of the phases of the sequence of carriers of the first RF signal.

39. The method according to claim 37, further comprising the steps of:

generating a reference signal used to synchronize the first and second synthesizers; and dividing the reference signal to generate the modulation signal.

40. The method according to claim 37, further comprising the steps of:

mixing the sequence of carriers of the third RF signal with the sequence of corresponding carriers of the received second RF signal to generate a sequence of DC in-phase components I;

shifting the phase of the sequence of carriers of the third RF signal by 90 degrees; and mixing the sequence of 90 degree phase-shifted carriers with the corresponding sequence of carriers of the received second RF signal to generate a sequence of DC quadrature-phase signals Q;

calculating the phase offsets of each of the carriers of the second RF signal using the I and Q components; and calculating the distance between the wireless communication device and the remote wireless device using the phase offsets.

41. The method of claim 37, further comprising the step of calculating the slope by executing a phase ambiguity algorithm to produce a relative phase offset among the carrier frequencies of the received second RF signal such that $\Phi(n):=0$ if $n=0$;

otherwise, $\Phi(n):=(\theta_n-\theta_{n-1})+\Phi(n-1)+\pi$ if $\theta_n-\theta_{n-1}<0$ $\Phi(n):=(\theta_n-\theta_{n-1})+\Phi(n-1)$ otherwise where $\theta_n$ is the phase offset for each carrier of the received second RF signals.

42. The method of claim 41, wherein the following relationships are used to calculate the distance between the wireless communication device and the remote wireless device: $D:=cT$, with $c:=3\times10^8$ m/s and T: $m/2\pi$, where m is the slope of the relative phase shift ($\Phi$) v. frequency line and D is the distance between the wireless communication device and the remote wireless device.

43. The method of claim 37, further comprising the step of transmitting information to the remote wireless device based on the distance between the wireless communication device and the remote wireless device.

44. The method of claim 37, further comprising the step of transferring data between the wireless communication device and the remote wireless device to complete a commercial transaction based on the distance between the wireless communication device and the remote wireless device.

45. The method of claim 37, further comprising the step determining the location of the wireless communication device based on the calculated distance from the remote wireless device.

46. The method of claim 37, further comprising the steps of:

mixing the sequence of carriers of the third RF signal with the corresponding sequence of carriers of the received second RF signal to generate a sequence of DC in-phase components I;

shifting the phase of the sequence of carriers of the third RF signal by 90 degrees; and mixing the sequence of 90 degree phase-shifted carriers with the corresponding sequence of carriers of the received second RF signal to generate a sequence of DC quadrature-phase signals Q;

calculating the phase offsets of each of the carriers of the second RF signal by using the I and Q components; and calculating the distance between the wireless communication device and the remote wireless device using the phase offsets.

47. A method of determining distance between a wireless communication device and a remote wireless device, the method comprising the steps of:

generating a first radio frequency (RF) signal, the first RF signal including a single carrier having a frequency ft0;

transmitting the first RF signal;

receiving a second RF signal from a remote wireless device phase locked with the wireless communication device, the second RF signal including a sequence of carriers, wherein the frequencies of the sequence of carriers of the second are different from ft0;

generating a third RF signal, the third RF signal including a sequence of carriers corresponding to the carriers of the second RF signal, wherein the phase of the third RF signal is coherent with the phase of the first RF signal, and wherein the frequencies of the corresponding sequence of carriers of the second RF signal are the same as the frequencies of the corresponding sequence of carriers of the third RF signal;

comparing the phase of each of the carriers of the second RF signal to the phase of each of the corresponding carriers of the third RF signal to generate a sequence of phase offsets;

calculating an estimated slope of the phase offsets relative to the frequencies of the sequence of carriers of the second RF signal, wherein the estimated slope is proportional to the distance between the wireless communication device and the remote device;

mixing the received second RF signal with the third RF signal to produce In-phase (I) and Quadrature (Q) signals;

solving for phase angle θ by applying the following relationship: θ=Arctan(Q/I)/2; and calculating the phase offset based on phase angle θ.

48. The method of claim 47, further comprising the step of modulating the sequence of carriers produced by the synthesizer with a modulation signal.

49. The method of claim 47, further comprising the step of calculating the slope by executing a phase ambiguity algorithm to produce a relative phase offset among the carrier frequencies of the received second RF signal such that $\Phi(n):=0$ if $n=0$;

otherwise, $\Phi(n):=(\theta_n-\theta_{n-1})+\Phi(n-1)+\pi$ if $\theta_n-\theta_{n-1}<0$ $\Phi(n):=(\theta_n-\theta_{n-1})+\Phi(n-1)$ otherwise where $\theta_n$ is the phase offset for each carrier of the received second RF signals.

50. The method of claim 47, further comprising the step of transmitting information to the remote wireless device based on the distance between the wireless communication device and the remote wireless device.

51. The method of claim 47, further comprising the step of transferring data between the wireless communication device and the remote wireless device to complete a commercial transaction based on the distance between the wireless communication device and the remote wireless device.

52. The method of claim 47, further comprising the step determining the location of the wireless communication device based on the calculated distance from the remote wireless device.

53. The method of claim 48, further comprising the steps of:

generating a reference signal used to synchronize the synthesizer; and dividing the reference signal to generate the modulation signal.

54. The method of claim 49, wherein the following relationships are used to calculate the distance between the wireless communication device and the remote wireless device: D:=cT, with c:=3×10$^8$ m/s and T: m/2π, where m is the slope of the relative phase shift (Φ) v. frequency line and D is the distance between the wireless communication device and the remote wireless device.

* * * * *